US008381382B2

(12) United States Patent
Wunnicke et al.

(10) Patent No.: US 8,381,382 B2
(45) Date of Patent: Feb. 26, 2013

(54) METHODS AND EQUIPMENT FOR ASSEMBLING TRIPLE-PANE INSULATING GLASS UNITS

(75) Inventors: William R. Wunnicke, Spring Green, WI (US); Robert E. Walsh, Richland Center, WI (US); Martin Westley, Spring Green, MN (US)

(73) Assignee: Cardinal IG Company, Eden Prairie, MN (US)

( * ) Notice: Subject to any disclaimer, the term of this patent is extended or adjusted under 35 U.S.C. 154(b) by 597 days.

(21) Appl. No.: 12/650,780

(22) Filed: Dec. 31, 2009

(65) Prior Publication Data

US 2011/0154635 A1 Jun. 30, 2011

(51) Int. Cl.
*B23P 11/00* (2006.01)
*C03C 27/00* (2006.01)
*B29C 65/00* (2006.01)

(52) U.S. Cl. ................ 29/430; 29/469; 29/458; 29/429; 156/109; 156/349; 156/539; 156/538; 156/556

(58) Field of Classification Search .................... 29/429, 29/430, 458, 469; 156/109, 107, 99, 106, 156/381, 349, 539, 538, 556
See application file for complete search history.

(56) References Cited

U.S. PATENT DOCUMENTS

| | | | |
|---|---|---|---|
| 2,525,717 | A | 10/1950 | Ottenheimer |
| 2,883,718 | A | 4/1959 | Sigfrid |
| 3,030,673 | A | 4/1962 | London |
| 3,226,903 | A | 1/1966 | Lillethun |
| 3,345,791 | A | 10/1967 | Shinefeld |
| 3,553,913 | A | 1/1971 | Eisenberg |
| 3,837,129 | A | 9/1974 | Losell |
| 3,875,706 | A | 4/1975 | Okawa |
| 3,876,489 | A | 4/1975 | Chenel |

(Continued)

FOREIGN PATENT DOCUMENTS

| | | | |
|---|---|---|---|
| DE | 2012597 | A1 | 10/1971 |
| DE | 3115566 | | 10/1982 |

(Continued)

OTHER PUBLICATIONS

English translation of German Patent No. 2012597, issued Oct. 14, 1971 to Mannheimer Isolierglas GMBH, 10 pages.

(Continued)

*Primary Examiner* — Essama Omgba
(74) *Attorney, Agent, or Firm* — Fredrikson & Byron, PA

(57) ABSTRACT

Embodiments of the present invention provide methods and equipment for automatically assembling three panes of glass and corresponding spacers so that air or other gas can be injected into the two between-pane spaces. The equipment can receive two glass panes that each have spacers coupled to one of their major surfaces, along with a third glass pane having no spacer coupled to its major surfaces, and can assemble the three glass panes into a "teepee" configuration in which the two spacers each contact two of the glass panes along a common edge of the glass panes. Preferred equipment can receive a glass pane in a first orientation and rotate the glass pane 180° to a second orientation in which the glass pane's two major surfaces face opposite directions from the first orientation. Such preferred equipment can then receive a two-pane teepee from a previous piece of equipment and can add the "flipped" single glass pane to the teepee to create a three-pane teepee.

14 Claims, 22 Drawing Sheets

U.S. PATENT DOCUMENTS

| | | | | |
|---|---|---|---|---|
| 4,004,389 | A | 1/1977 | Difazio | |
| 4,047,351 | A | 9/1977 | Derner | |
| 4,114,342 | A | 9/1978 | Okawa | |
| 4,149,348 | A | 4/1979 | Pyzewski | |
| 4,247,355 | A | 1/1981 | Friedrick et al. | |
| 4,368,226 | A | 1/1983 | Mucaria | |
| 4,369,084 | A | 1/1983 | Lisec | |
| 4,432,179 | A | 2/1984 | Bachmann | |
| 4,459,789 | A | 7/1984 | Ford | |
| 4,495,023 | A * | 1/1985 | Lisec | 156/562 |
| 4,563,843 | A | 1/1986 | Grether | |
| 4,598,520 | A | 7/1986 | Ellstrom | |
| 4,624,091 | A | 11/1986 | Biro | |
| 4,708,762 | A * | 11/1987 | Lenhardt | 156/556 |
| 4,778,504 | A * | 10/1988 | Kulla | 65/58 |
| 4,780,164 | A | 10/1988 | Rueckheim et al. | |
| 4,815,245 | A | 3/1989 | Gartner | |
| 4,909,874 | A | 3/1990 | Rueckheim | |
| 4,963,206 | A | 10/1990 | Shacklette | |
| 4,996,105 | A | 2/1991 | Oyama | |
| 5,017,252 | A | 5/1991 | Aldrich et al. | |
| 5,051,145 | A | 9/1991 | Lenhardt | |
| H975 | H | 11/1991 | Selkowitz | |
| 5,088,188 | A | 2/1992 | Riou | |
| 5,099,621 | A | 3/1992 | Schacklette | |
| 5,107,655 | A | 4/1992 | Lindgren | |
| 5,123,211 | A | 6/1992 | Schlicht | |
| 5,167,756 | A * | 12/1992 | Lenhardt | 156/578 |
| 5,270,084 | A | 12/1993 | Parker | |
| 5,306,547 | A | 4/1994 | Hood | |
| 5,332,080 | A | 7/1994 | Lenhardt | |
| 5,366,574 | A | 11/1994 | Lenhardt | |
| 5,413,156 | A | 5/1995 | Lisec | |
| 5,476,124 | A | 12/1995 | Lisec | |
| 5,494,715 | A | 2/1996 | Glover | |
| 5,531,047 | A | 7/1996 | Leopold | |
| 5,533,314 | A | 7/1996 | Kunert | |
| 5,551,195 | A | 9/1996 | Vanderstukken | |
| 5,553,440 | A | 9/1996 | Bulger | |
| 5,573,618 | A | 11/1996 | Rueckheim | |
| 5,599,422 | A | 2/1997 | Adams, Jr. | |
| 5,601,677 | A | 2/1997 | Leopold | |
| 5,626,712 | A | 5/1997 | Lisec | |
| 5,644,894 | A | 7/1997 | Hudson | |
| 5,645,678 | A | 7/1997 | Lisec | |
| 5,653,073 | A | 8/1997 | Palmer | |
| 5,676,782 | A | 10/1997 | Lisec | |
| 5,753,069 | A * | 5/1998 | Rueckheim | 156/382 |
| 5,762,739 | A | 6/1998 | Lenhardt | |
| 5,784,853 | A | 7/1998 | Hood | |
| 5,837,361 | A | 11/1998 | Glaser | |
| 5,957,169 | A | 9/1999 | Trpkovski | |
| 6,108,999 | A | 8/2000 | Smith | |
| 6,115,989 | A | 9/2000 | Boone | |
| 6,132,881 | A | 10/2000 | Hartig | |
| 6,177,156 | B1 | 1/2001 | Glover | |
| 6,180,196 | B1 | 1/2001 | Glover | |
| 6,216,751 | B1 | 4/2001 | Trpkovski | |
| 6,250,026 | B1 | 6/2001 | Thompson, Jr. | |
| 6,266,940 | B1 | 7/2001 | Reichert | |
| 6,286,288 | B1 | 9/2001 | France | |
| 6,289,641 | B1 | 9/2001 | McCandless | |
| 6,295,788 | B2 | 10/2001 | Reichert | |
| 6,415,561 | B2 | 7/2002 | Thompson | |
| 6,477,812 | B2 | 11/2002 | Boone | |
| 6,536,182 | B2 | 3/2003 | France | |
| 6,609,611 | B1 | 8/2003 | Lenhardt | |
| 6,830,791 | B1 | 12/2004 | Misonou | |
| 6,872,453 | B2 | 3/2005 | Arnaud | |
| 6,924,037 | B1 | 8/2005 | Joret | |
| 6,962,638 | B2 | 11/2005 | Okino | |
| 6,974,518 | B2 | 12/2005 | Hornung | |
| 7,001,464 | B1 | 2/2006 | Erdman | |
| 7,026,571 | B2 | 4/2006 | Larsen | |
| 7,100,343 | B2 | 9/2006 | France | |
| 7,122,088 | B2 | 10/2006 | Field | |
| 7,169,441 | B2 | 1/2007 | Vitt | |
| 7,213,375 | B2 | 5/2007 | Morgan | |
| 7,244,325 | B2 | 7/2007 | Abate | |
| 7,246,466 | B2 | 7/2007 | Turner | |
| 7,258,757 | B2 | 8/2007 | Huang | |
| 7,299,844 | B2 | 11/2007 | Lisec | |
| 7,311,976 | B2 | 12/2007 | Arnaud | |
| 7,641,545 | B2 | 1/2010 | Chen | |
| 7,674,343 | B2 | 3/2010 | Kawamori | |
| 7,785,432 | B2 * | 8/2010 | Lenhardt | 156/109 |
| 8,196,635 | B2 * | 6/2012 | Lenhardt | 156/578 |
| 2004/0231255 | A1 | 11/2004 | Silverman | |
| 2006/0165874 | A1 | 7/2006 | Erdman | |
| 2006/0165963 | A1 | 7/2006 | Fleury | |
| 2006/0218875 | A1 | 10/2006 | Hornung | |
| 2006/0254203 | A1 | 11/2006 | France | |
| 2006/0260229 | A1 | 11/2006 | McKinlay | |
| 2006/0272236 | A1 | 12/2006 | Williams | |
| 2006/0283554 | A1 | 12/2006 | Field | |
| 2007/0068616 | A1 | 3/2007 | Schuler | |
| 2007/0082219 | A1 | 4/2007 | Fleury | |
| 2007/0175564 | A1 | 8/2007 | Lenhardt | |
| 2007/0175733 | A1 * | 8/2007 | Lenhardt | 198/468.6 |
| 2007/0188871 | A1 | 8/2007 | Fleury | |
| 2007/0295441 | A1 | 12/2007 | Schuler | |
| 2010/0287756 | A1 * | 11/2010 | Briese et al. | 29/462 |
| 2012/0047708 | A1 * | 3/2012 | Briese et al. | 29/428 |

FOREIGN PATENT DOCUMENTS

| | | | |
|---|---|---|---|
| DE | 3402323 | | 8/1985 |
| DE | 4315986 | | 11/1994 |
| DE | 29504900 | | 6/1995 |
| DE | 102010035748 | A1 * | 11/2011 |
| EP | 0056762 | | 1/1985 |
| EP | 0857849 | B1 | 8/1998 |
| WO | 03/014511 | | 2/2003 |
| WO | 2006/059024 | | 6/2006 |

OTHER PUBLICATIONS

English abstract of European Patent No. 0857849, issued Aug. 12, 1998 to Lenhardt Maschinenbau [DE], 1 page.

Notification of Transmittal of the International Search Report and the Written Opinion of the International Searching Authority, or the Declaration of corresponding PCT/US2010/061994, mailed Mar. 3, 2011, 11 pages.

* cited by examiner

METHODS AND EQUIPMENT FOR ASSEMBLING TRIPLE-PANE INSULATING GLASS UNITS

TECHNICAL FIELD

This disclosure is related to construction of insulating glass units and, more particularly, to construction of triple-pane insulating glass units.

BACKGROUND

Traditionally, an insulating glass unit (i.e., an "IG unit" or "IGU") has included two generally parallel glass panes held in a spaced-apart relationship by a spacer. While many standard IG units simply contain air in the between-pane space, high performance IG units are sometimes filled with insulative gas to increase the insulating capacity of the units. Whether an IG unit is filled with insulative gas or air, it is conventional in the art to provide the gas fill at a pressure that is approximately atmospheric. Filling the between-pane space of an IG unit with insulative gas advantageously increases the "R" value (i.e., the resistance to heat flow through the unit) of the resulting unit.

More recently, triple-pane IG units have become more common. A triple-pane IG unit includes three generally parallel glass panes held in spaced-apart relationship by two spacers. FIG. 2, which is discussed in greater detail below, shows an illustrative triple-pane IG unit. Air or gas is provided in the two spaces between the glass panes. Triple-pane IG units can provide increased R values compared with double-pane IG units.

Constructing triple-pane units has typically involved significant amounts of manual labor. As a glass pane is being conveyed through an IG unit assembly line, an operator adds a spacer to one of the glass pane's major surfaces. The operator then manually grasps and carries a second glass pane and leans it against the first glass pane such that the second glass pane contacts the spacer along at least one edge. The operator then adds a spacer to the outward facing major surface of the second glass pane. Then the operator manually grasps and carries a third glass pane and leans it against the second glass pane such that the third glass pane contacts the spacer along at least one edge. The three glass panes and the corresponding two spacers form a teepee configuration, which is typically conveyed to subsequent processing equipment for gas injection and/or other processes.

This method of constructing triple-pane IG units presents several disadvantages. In many instances, grasping and transporting glass panes is hard on the operator. The glass panes are often quite heavy and awkward to carry. Often, multiple operators are required because the glass panes are simply too difficult for one operator to lift. Manual lifting and carrying also significantly increases the likelihood of dropping and breaking the glass panes, making the manufacturing process more costly. Additionally, and perhaps more importantly, manual lifting and carrying substantially slows down the manufacturing process.

SUMMARY

Embodiments of the present invention provide methods and equipment for automatically assembling three panes of glass and corresponding spacers so that air or other gas can be injected into the two between-pane spaces. The equipment can receive two glass panes that each have spacers coupled to one of their major surfaces, along with a third glass pane having no spacer coupled to its major surfaces, and can assemble the three glass panes into a "teepee" configuration in which the two spacers each contact two of the glass panes along a common edge of the glass panes. Preferred equipment can receive a glass pane in a first orientation and rotate the glass pane 180° to a second orientation in which the glass pane's two major surfaces face opposite directions from the first orientation. Such preferred equipment can then receive a two-pane teepee from a previous piece of equipment and can add the "flipped" single glass pane to the teepee to create a three-pane teepee.

Embodiments of the present invention can provide one or more of the following advantages. Equipment and methods according to the present invention can significantly increase manufacturing efficiency by reducing costs (e.g., due to broken panes) and/or increasing throughput. If the first glass pane has a coating on one of its major surfaces, equipment that flips the first glass pane 180° can handle the coating-less surface (e.g., rolling the surface against idler rollers, grasping the surface with suction cups, etc.) while leaving the coated surface essentially undisturbed, thereby minimizing disruption to the coating. Similarly, if the first glass pane has a spacer coupled to one of its major surfaces, equipment that flips the first glass pane 180° can handle the spacer-less surface rather than the surface with the spacer, which can make handling of the first glass pane substantially easier. If an edge delete process occurs prior to the formation of teepees, equipment that flips the first glass pane 180° can receive the first glass pane in the same orientation as it was during the edge delete process and can re-orient it for purposes of forming a three-pane teepee. Some embodiments can provide for increased operator safety. In some embodiments, the same assembly line can make double-pane and triple-pane IG units. Other aspects, features, and advantages will be apparent from the following detailed description, including the drawings and the claims.

BRIEF DESCRIPTION OF THE DRAWINGS

The following drawings are illustrative of particular embodiments of the present invention and therefore do not limit the scope of the invention. The drawings are not to scale (unless so stated) and are intended for use in connection with the explanations in the following detailed description. Embodiments of the present invention will hereinafter be described in connection with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

Figure 1:
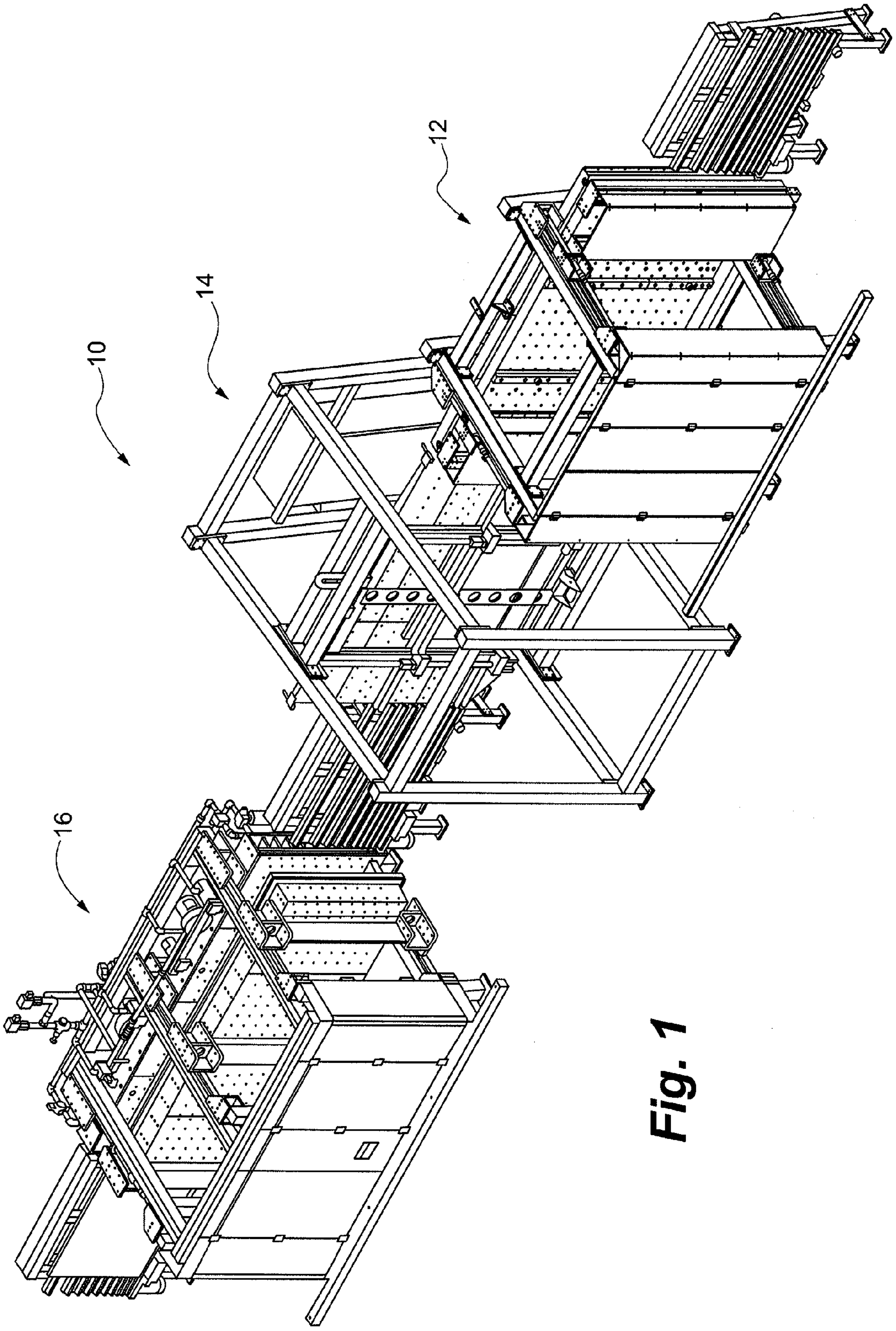
FIG. 1 is a perspective view of an illustrative system for the construction of triple-pane insulating glass units, according to the present invention.

FIG. 1 shows an illustrative system 10 for the construction of triple-pane insulating glass units. As shown, the system 10 includes a first apparatus 12, a second apparatus 14, and a third apparatus 16. As is discussed in greater detail below, the first apparatus 12 can be configured to receive a glass pane with a spacer and a glass pane without a spacer and to assemble the two glass panes such that they face one another and the spacer-less pane contacts the spacer along at least one edge. Additionally, as is discussed in greater detail below, the second apparatus 14 can be configured to receive one glass pane with a spacer, along with a two-pane assembly from the first apparatus 12, and to assemble the three glass panes such that they all face one another and the spacer-less pane contacts both spacers along at least one edge. Also, as is discussed in greater detail below, the third apparatus 16 can be configured to receive a three-pane assembly from the second apparatus 14, to inject gas into the two spaces between the three glass panes, and to press the three panes together such that the spacer-less pane contacts both spacers on all sides, thereby sealing the two spaces between the panes. As noted, structure and functionality of the first, second, and third apparatuses 12, 14, 16 are discussed in greater detail below.

Many systems for constructing triple-pane insulating glass units include several other apparatuses for performing various operations. For example, additional apparatuses can apply one or more coatings to the glass panes, wash glass panes before applying spacers, press triple-pane assemblies to their finished thicknesses, conduct various tests, and so on. In some embodiments, the system 10 can include less than all of the first, second, and third apparatuses 12, 14, 16, in combination with one or more other apparatuses such as those discussed in this paragraph. Some of the other apparatuses can be positioned before the first apparatus 12 in the construction process, which would coincide with the right side of FIG. 1. Some of the apparatuses are positioned after the third apparatus in the construction process, which would coincide with the left side of the page in FIG. 1. In some embodiments, one or more apparatuses can be positioned between the first and second apparatuses 12, 14 and/or between the second and third apparatuses.

Figure 2B:
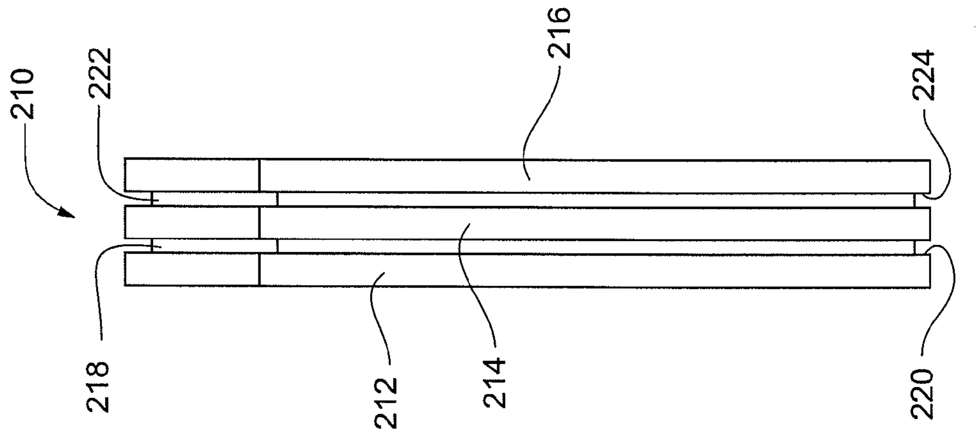
FIG. 2B is an assembled view of the illustrative triple-pane insulating glass unit of FIG. 2A.
Figure 2A:
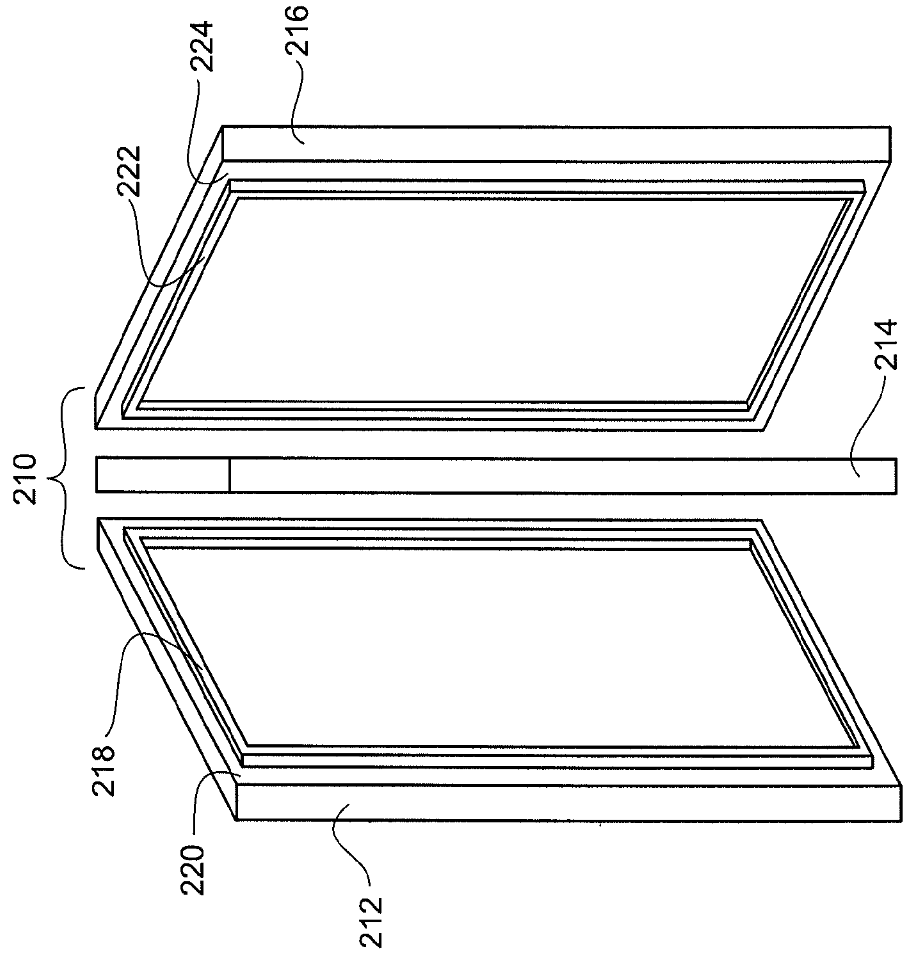
FIG. 2A is an exploded view of an illustrative triple-pane insulating glass unit.
Figure 3:
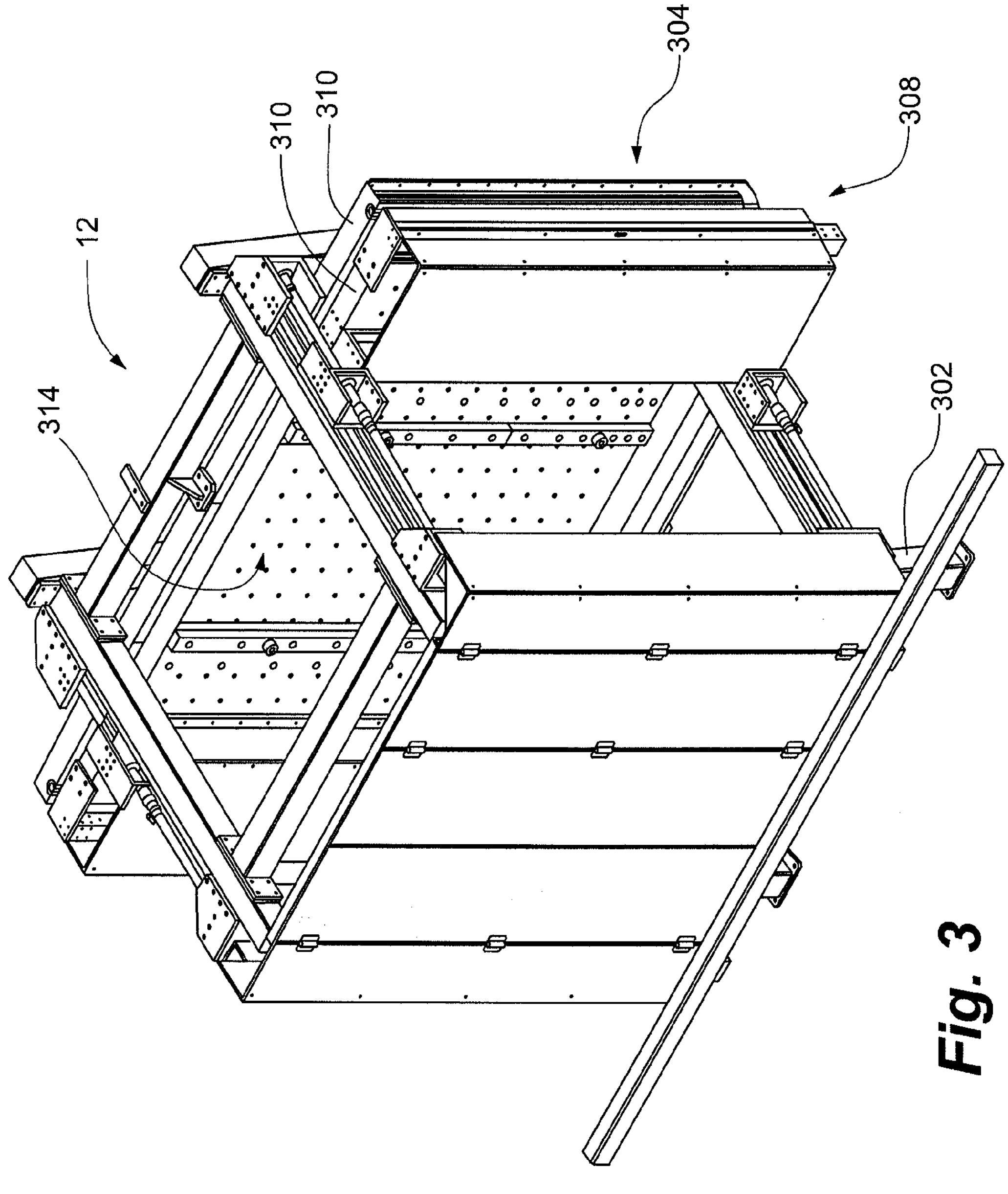
FIG. 3 is a perspective view of an illustrative apparatus for assembling two glass panes such that they face one another.

As noted, the system of FIG. 1 is configured to construct triple-pane insulating glass units. FIGS. 2A-2B show an illustrative triple-pane insulating glass unit 210. FIG. 2A shows an exploded view of the triple-pane insulating glass unit 210, and FIG. 2B shows an assembled view of the triple-pane insulating glass unit 210. The illustrative triple-pane insulating glass unit 210 includes a first glass pane 212, a second glass pane 214, and a third glass pane 216. The first glass pane 212 includes a spacer 218 coupled to one of its major surfaces 220. Typically, the second glass pane 214 does not include a spacer. As shown, the third glass pane 216 includes a spacer 222 coupled to one of its major surfaces 224.

As noted above, in many embodiments, one or more glass coatings can be applied to surfaces of the triple-pane insulating glass unit 210. Examples of coatings include low-emissivity coatings, solar control coatings, hydrophilic coatings, hydrophobic coatings, photocatalytic coatings, photovoltaic coatings, electrochromic coatings, mirror coatings, and anti-reflective coatings. The major surfaces of the three glass panes in a triple pane insulating glass unit are often numbered 1-6, starting with the major surface that would be the building exterior and ending with the major surface that would be the building interior. Referring to the illustrative triple-pane insulating glass unit 210 of FIGS. 2A-2B, in some embodiments, major surface 220 of the first glass pane 212 (i.e., surface 2 if the exterior of the building is to the left of the page) and/or major surface 224 of the third glass pane 216 (i.e., surface 5 if the interior of the building is to the right of the page) can be coated with one or more glass coatings, such as those noted above.

FIGS. 3-7B illustrate aspects of the first apparatus 12 of FIG. 1 in various stages of an illustrative operation. Embodiments of the first apparatus include various structural features. The first apparatus 12 includes a base 302, a glass pane handling mechanism 304, and an actuating mechanism 306. The glass pane handling mechanism 304, which can be configured to receive and perform operations on glass panes, can include a support structure 308 coupled to the base 302 and two opposed side panels 310, with the support structure 308 and the opposed side panels 310 being coupled to or integral with one another. The glass pane handling mechanism 304 can include whatever structural components are used to receive one or more glass panes as input, process the glass pane(s), and provide the processed glass pane(s) as output. For example, in some embodiments, the glass pane handling mechanism 304 can include a conveying mechanism 312 and a securing mechanism 314. As is discussed in greater detail elsewhere herein, the conveying mechanism 312 can be adapted to convey glass panes into and out of a position between the opposed side panels 310, and the securing mechanism 314 can be adapted to releasably secure glass panes conveyed into the position between the opposed side panels 310. The glass pane handling mechanism's conveying mechanism 312 and securing mechanism 314 can be coupled to the support structure 308.

Figure 4B:
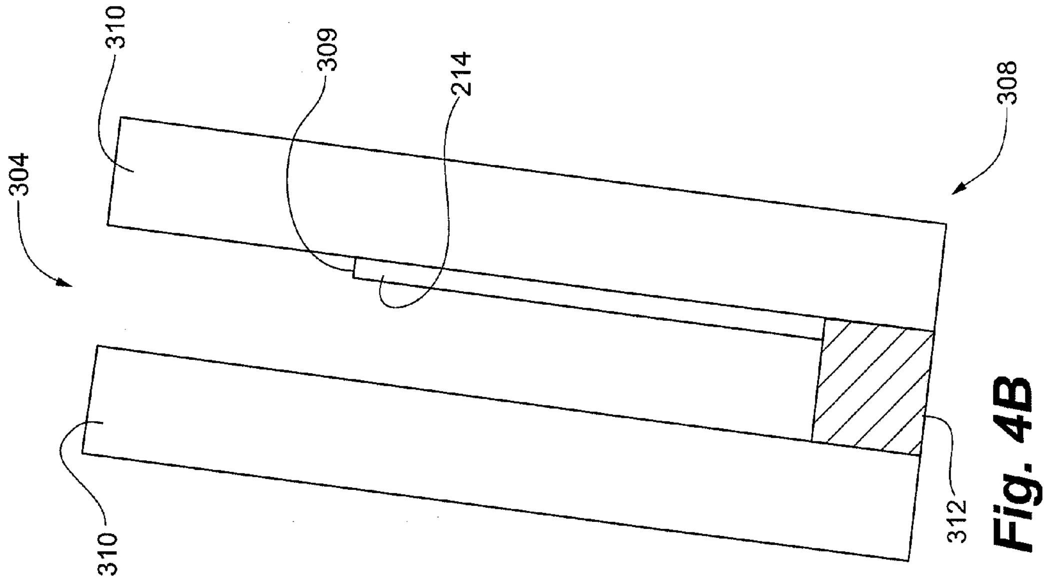
FIG. 4B is a schematic view of a portion of FIG. 4A.
Figure 4A:
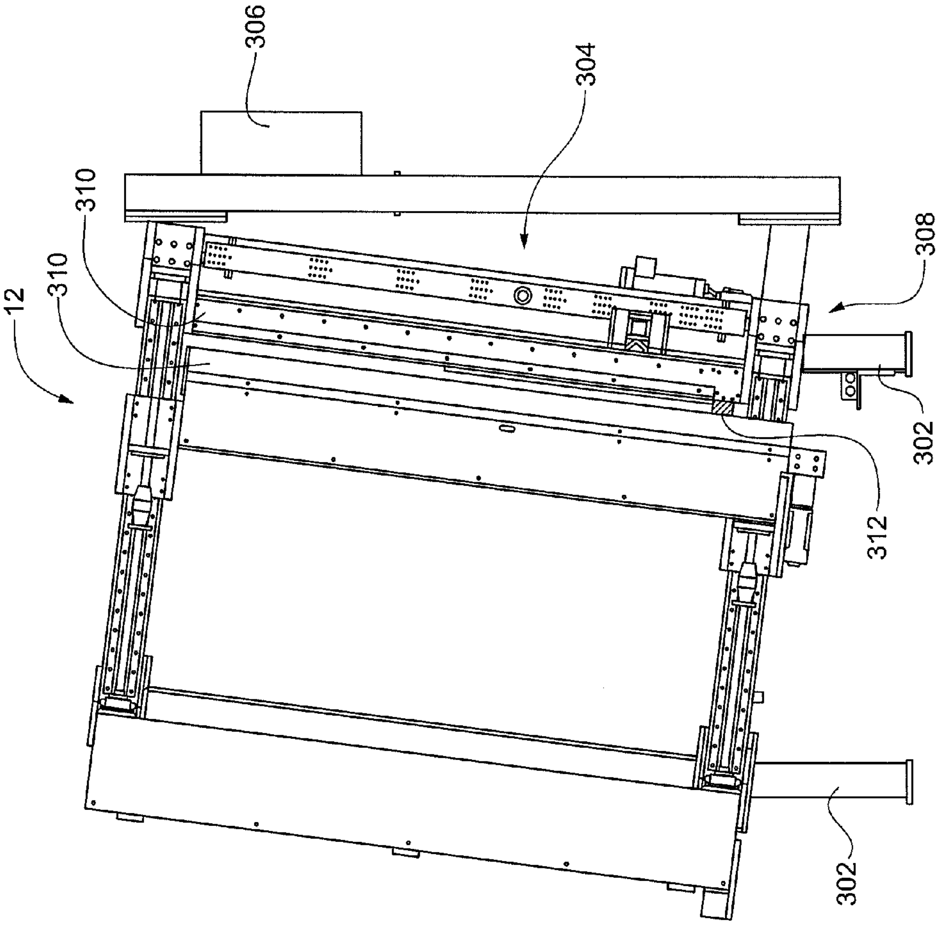
FIG. 4A is a side view of the apparatus of FIG. 3 at a particular operational stage.

In many embodiments, the first apparatus's actuating mechanism 306 can control the operation of the first apparatus 12. In many embodiments, the actuating mechanism 306 can be in electronic communication with the glass pane handling mechanism 304. The actuating mechanism 306 can be adapted to cause the first apparatus's conveying mechanism 312 to convey a first glass pane and spacer (not shown in FIGS. 3-7B) through the first apparatus 12 without performing any processes on it. The actuating mechanism 306 can be adapted to cause the first apparatus's conveying mechanism 312 to convey a second glass pane 214 into the position between the first apparatus's opposed side panels 310. FIGS. 4A-4B show the second glass pane 214 having been conveyed into the position between the opposed side panels 310.

Figure 5:
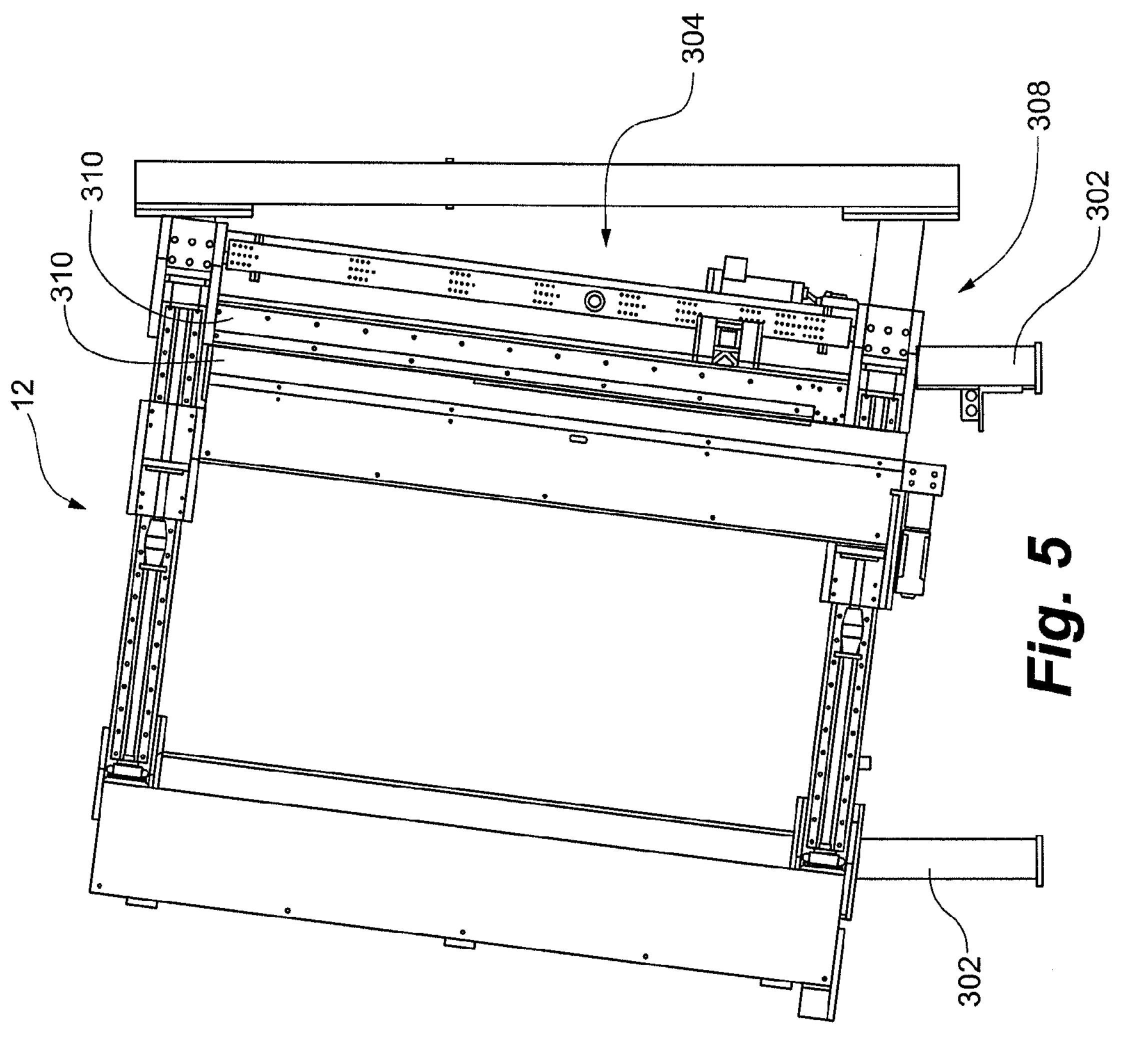
FIG. 5 is a side view of the apparatus of FIG. 3 at a particular operational stage.
Figure 6B:
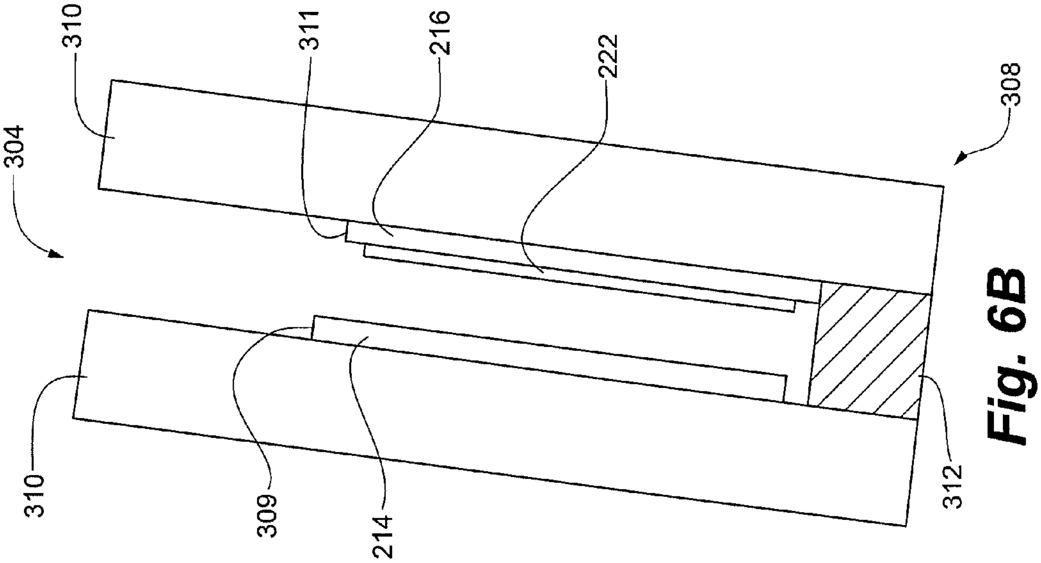
FIG. 6B is a schematic view of a portion of FIG. 6A.
Figure 6A:
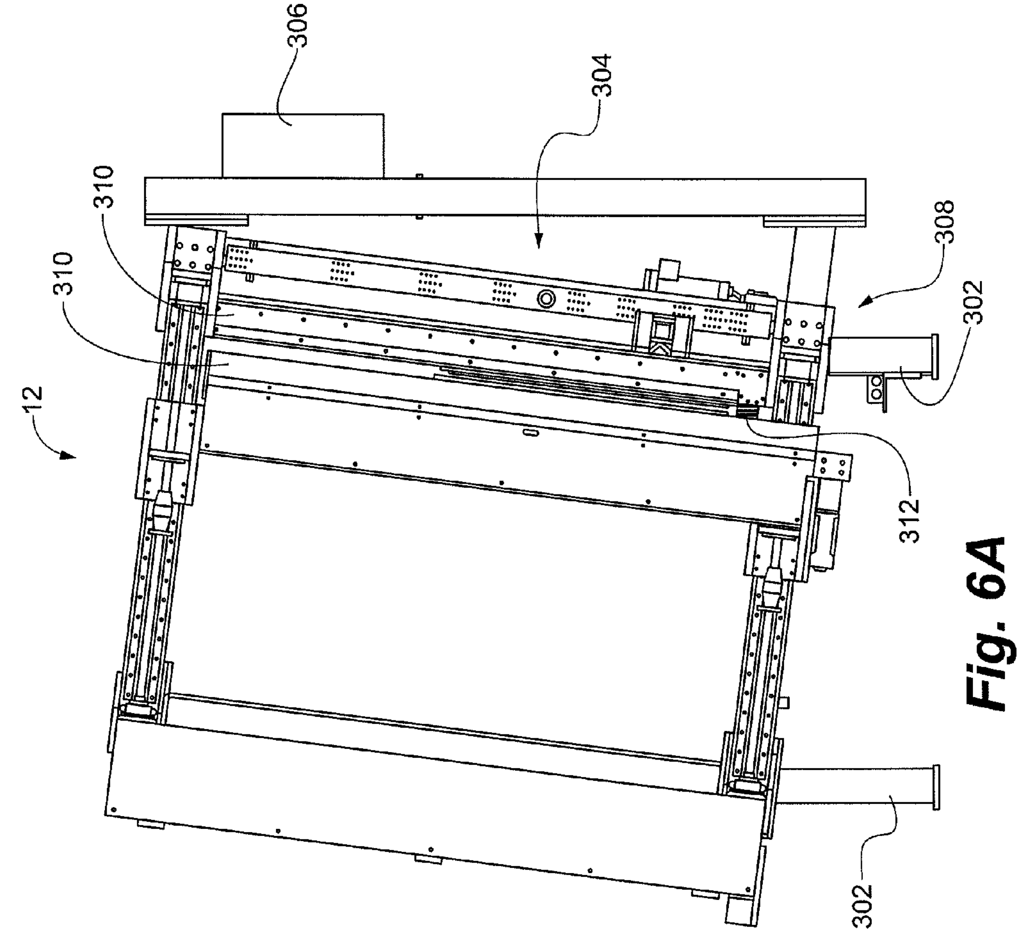
FIG. 6A is a side view of the apparatus of FIG. 3 at a particular operational stage.

With the second glass pane 214 being between the opposed side panels 310 of the first apparatus 12, the first apparatus 12 can prepare for receiving the third glass pane 216. The actuating mechanism 306 of the first apparatus 12 can be adapted to cause the first apparatus's securing mechanism 314 to secure the second glass pane 214. The first apparatus 12 can lift the second glass pane 214 off the conveying mechanism 312 to allow the third glass pane 216 to be conveyed into the first apparatus 12. The first apparatus 12 can close (as shown in FIG. 5), and the securing mechanism 314 can remove the second glass pane 214 from the conveying mechanism 312. FIGS. 6A-6B shows the second glass pane 214 having been removed from the conveying mechanism 312 and held by one of the side panels 310. This can be done via suction cups or other suitable mechanisms for removing the second glass pane from the conveying mechanism.

The third glass pane 216 can be conveyed into the first apparatus 12 with the second glass pane 214 being removed from the conveying path. The actuating mechanism 306 of the first apparatus can be adapted to cause the first apparatus's conveying mechanism 312 to convey the third glass pane 216 into the position between the first apparatus's opposed side panels 310. FIGS. 6A-6B show the third glass pane 216 having been conveyed into the position between the opposed side panels 310. As can be seen, the third glass pane 216 can have a spacer 222 coupled to one of its major surfaces.

Figure 7B:
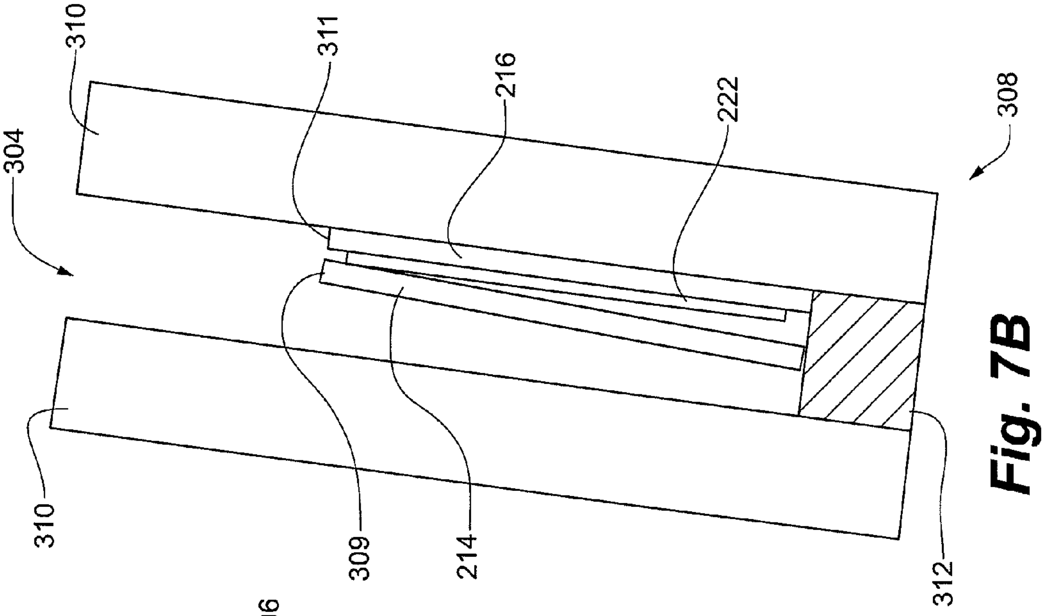
FIG. 7B is a schematic view of a portion of FIG. 7A.
Figure 7A:
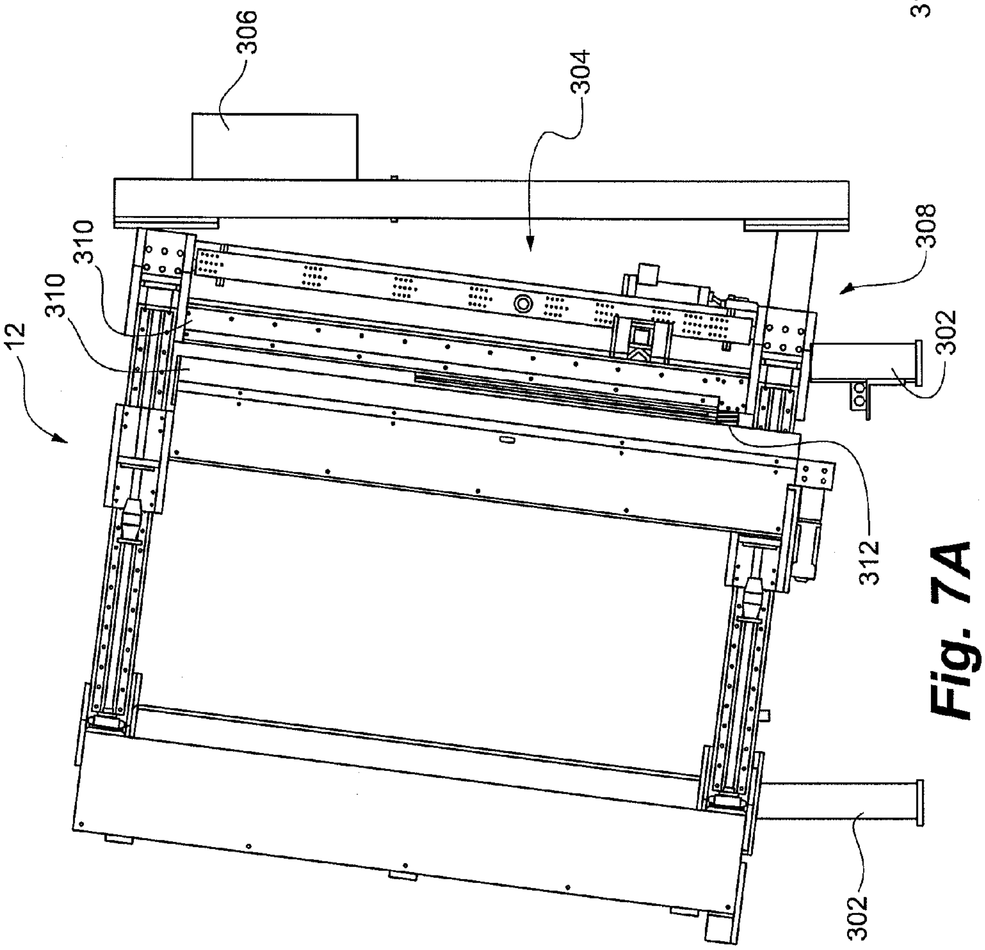
FIG. 7A is a side view of the apparatus of FIG. 3 at a particular operational stage.
Figure 8:
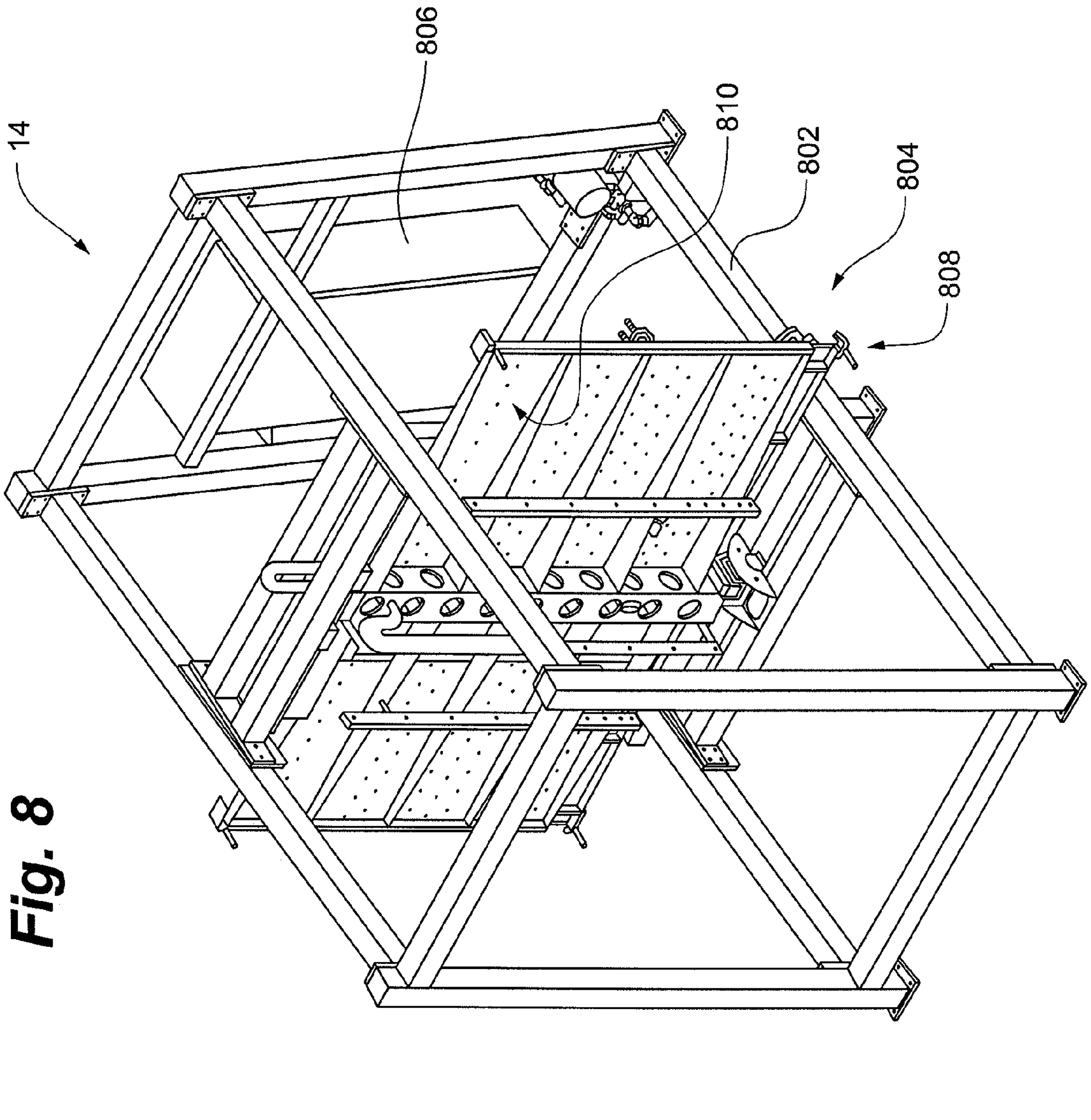
FIG. 8 is a perspective view of an illustrative apparatus for assembling three glass panes such that they all face one another, according to the present invention.
Figure 9B:
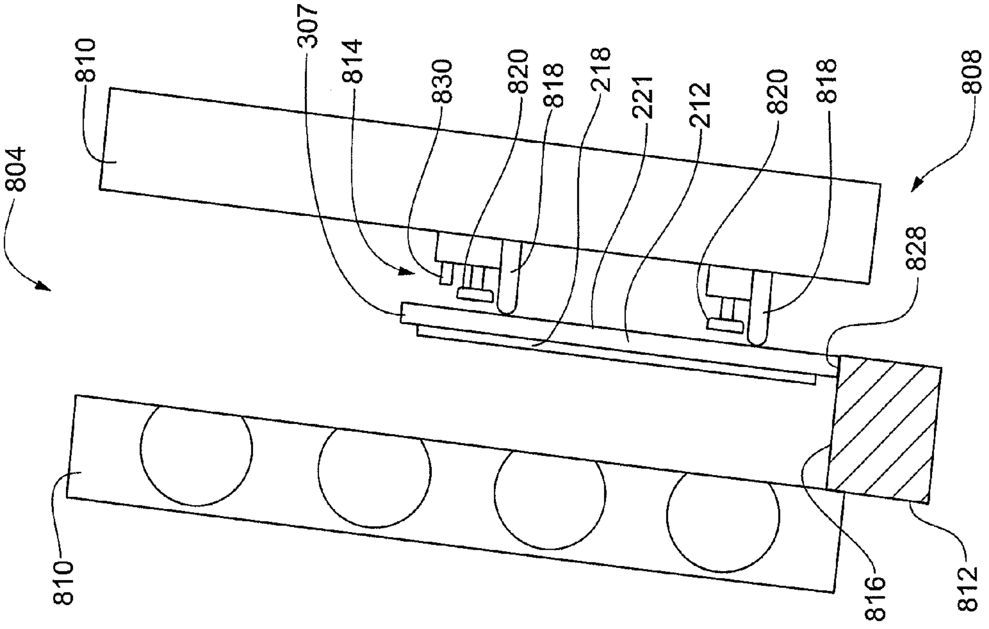
FIG. 9B is a schematic view of a portion of FIG. 9A.
Figure 9A:
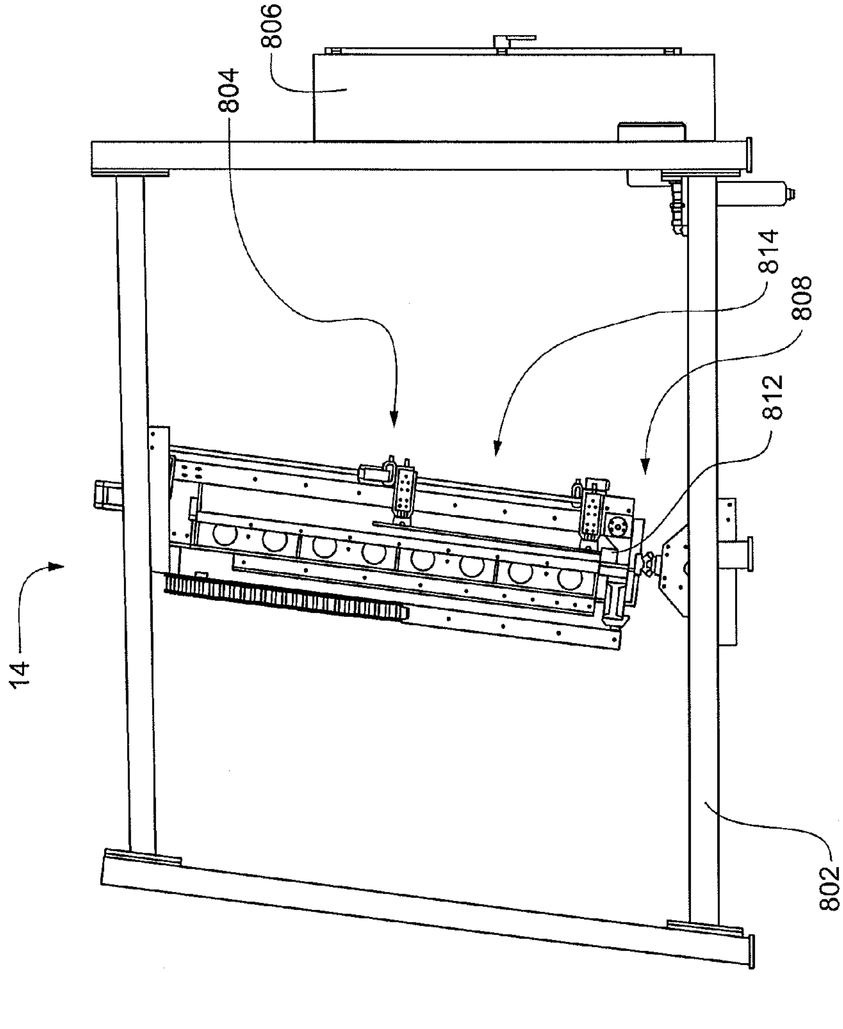
FIG. 9A is a side view of the apparatus of FIG. 8 at a particular operational stage.
Figure 10B:
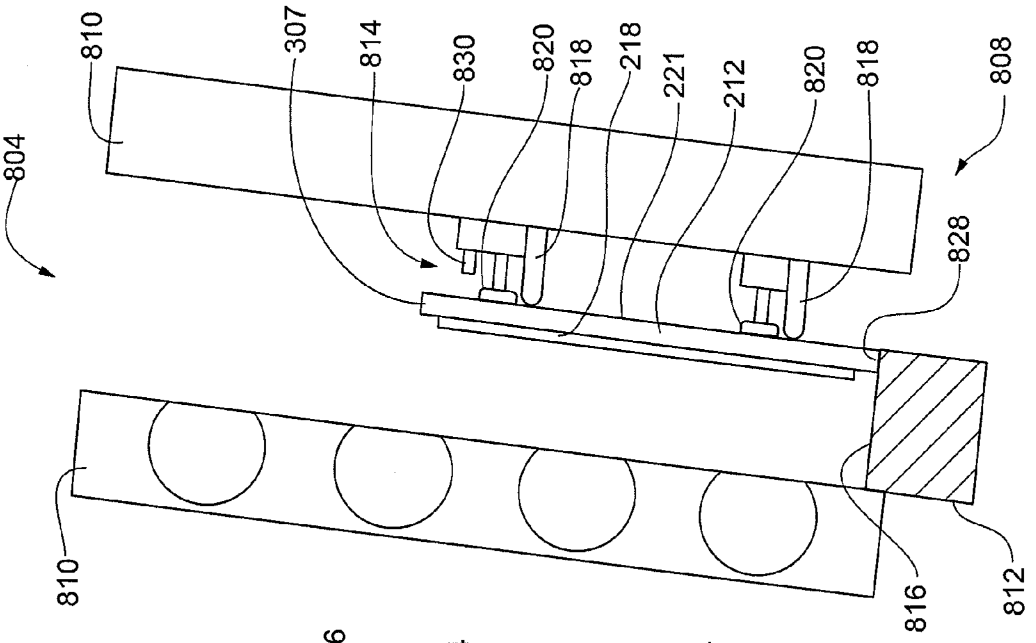
FIG. 10B is a schematic view of a portion of FIG. 10A.
Figure 10A:
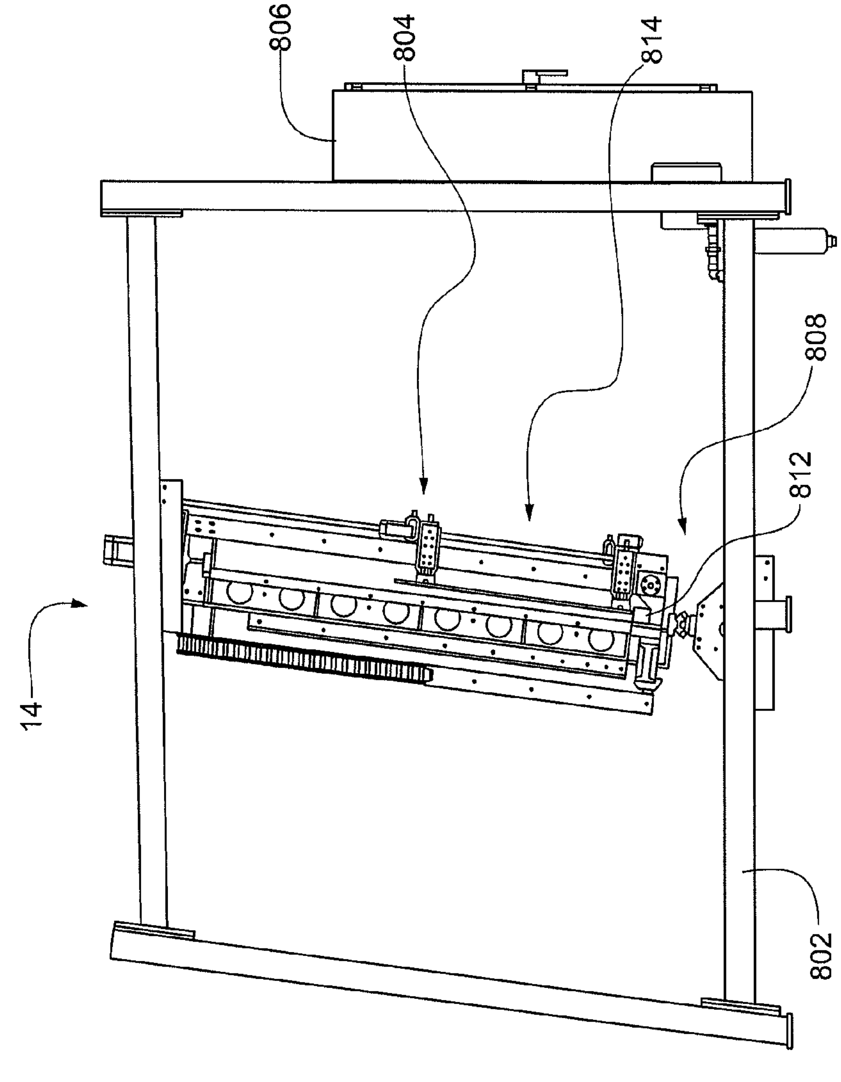
FIG. 10A is a side view of the apparatus of FIG. 8 at a particular operational stage.
Figure 11B:
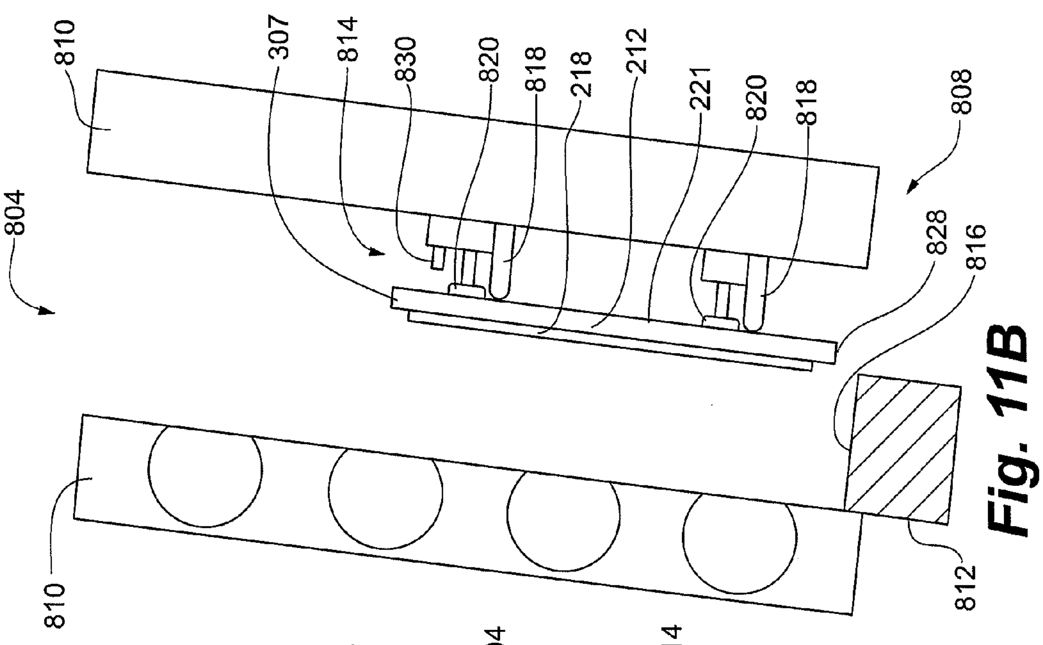
FIG. 11B is a schematic view of a portion of FIG. 11A.
Figure 11A:
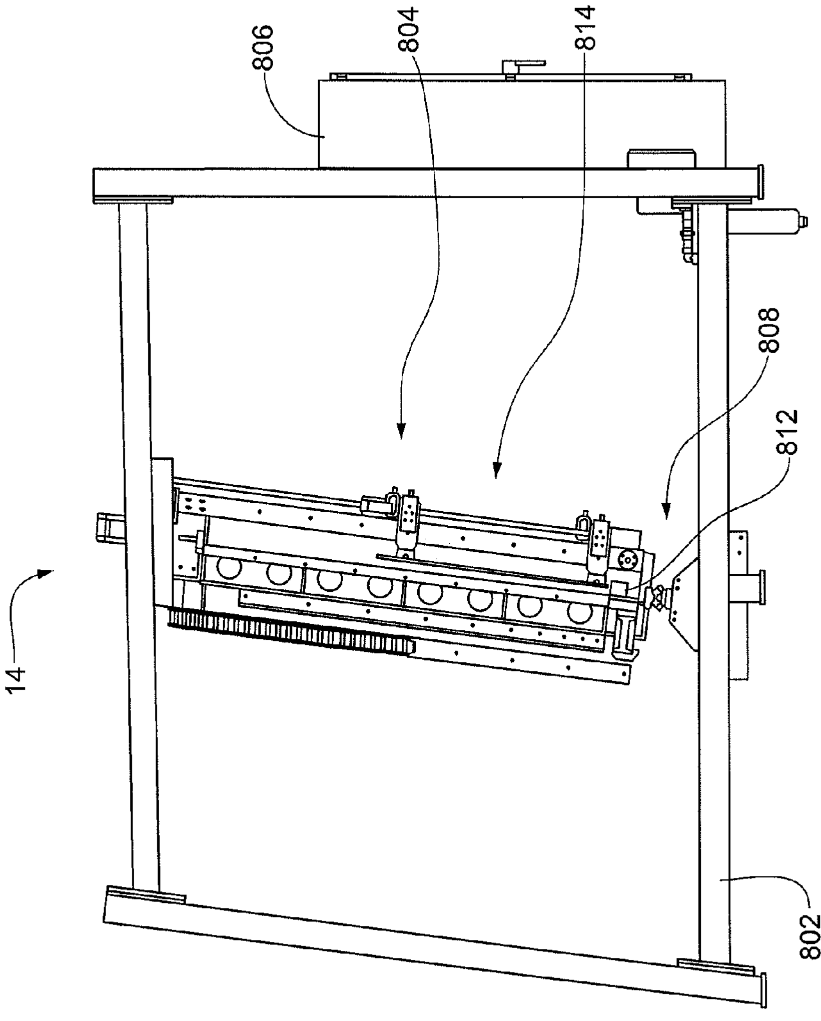
FIG. 11A is a side view of the apparatus of FIG. 8 at a particular operational stage.
Figure 12:
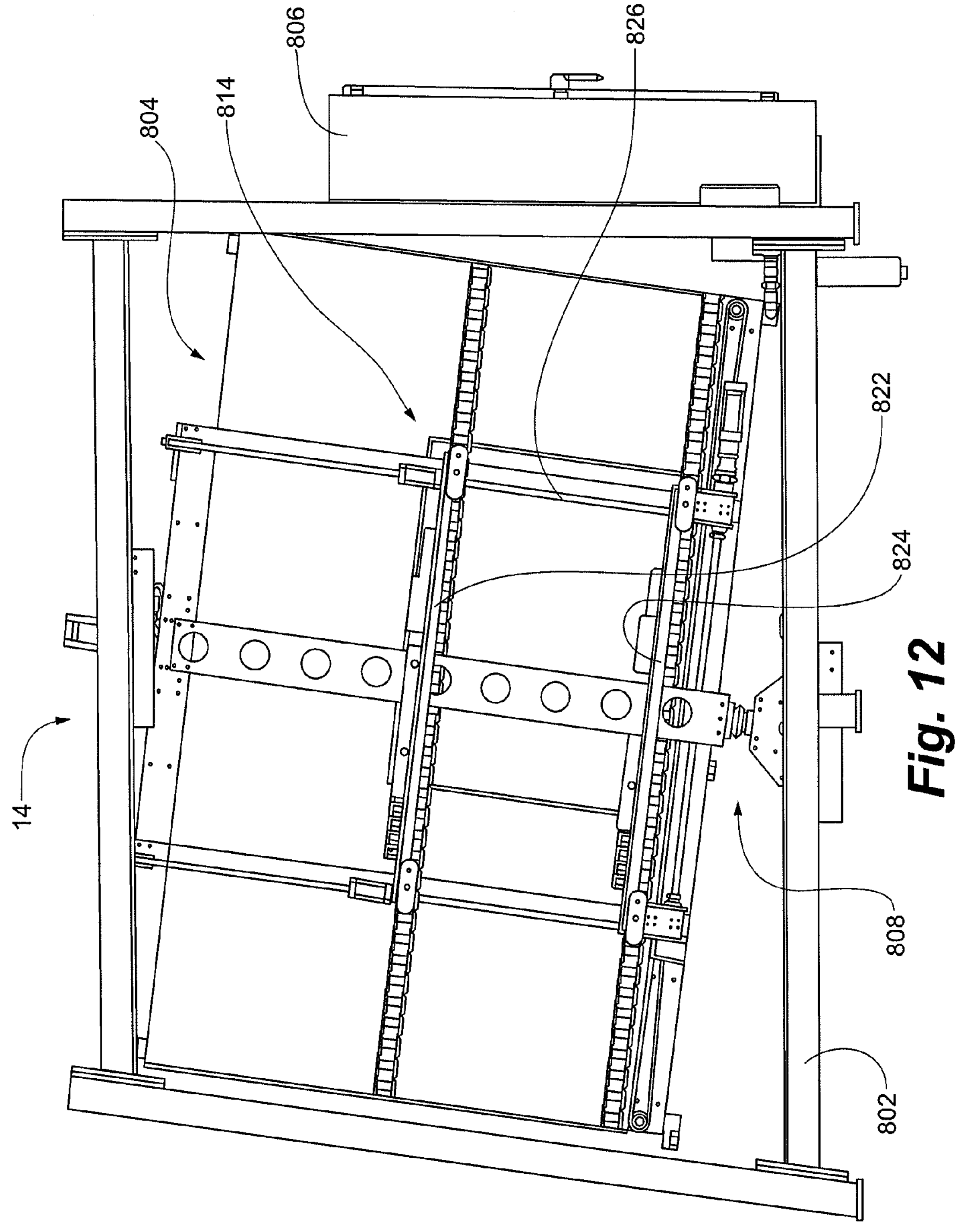
FIG. 12 is a side view of the apparatus of FIG. 8 at a particular operational stage.
Figure 13B:
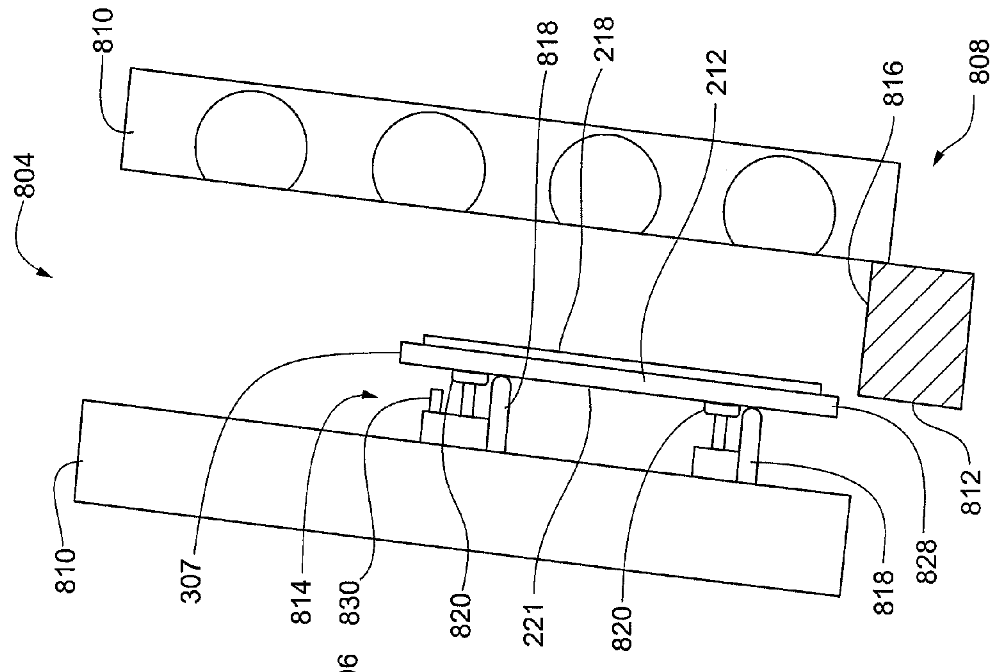
FIG. 13B is a schematic view of a portion of FIG. 13A.
Figure 13A:
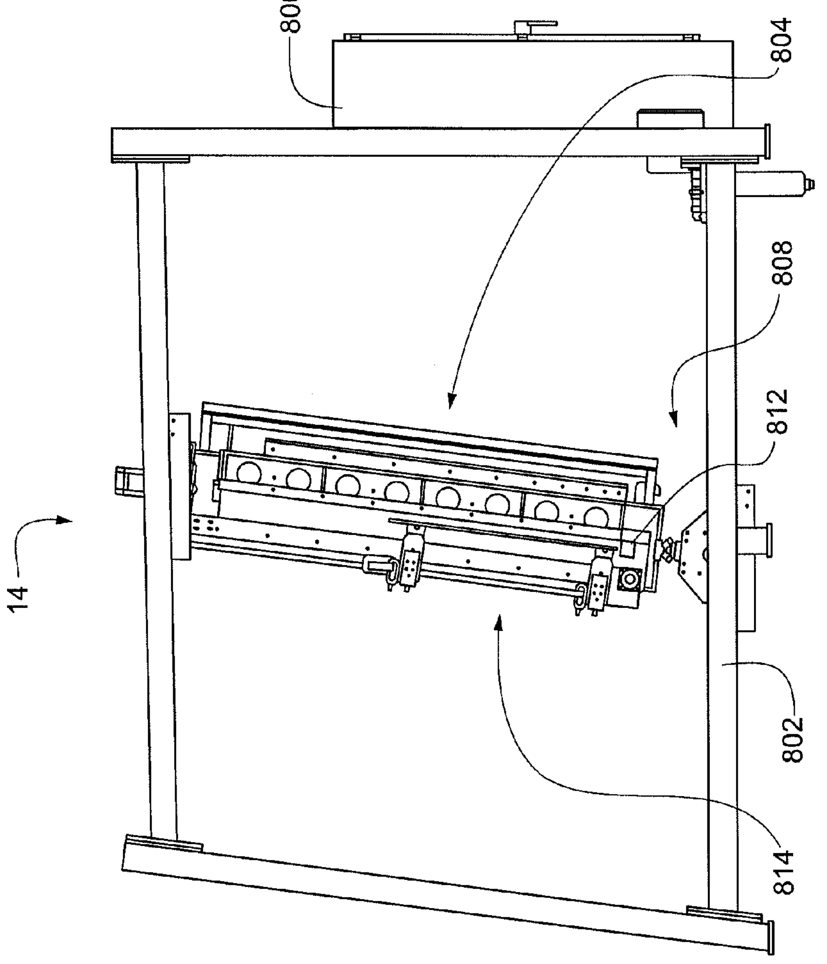
FIG. 13A is a side view of the apparatus of FIG. 8 at a particular operational stage.
Figure 14B:
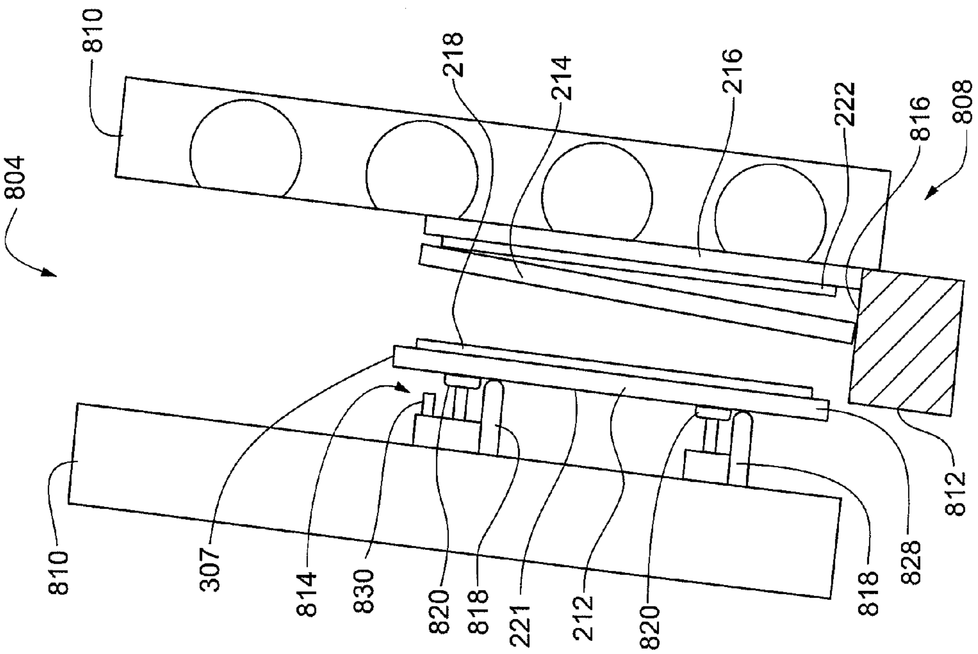
FIG. 14B is a schematic view of a portion of FIG. 14A.
Figure 14A:
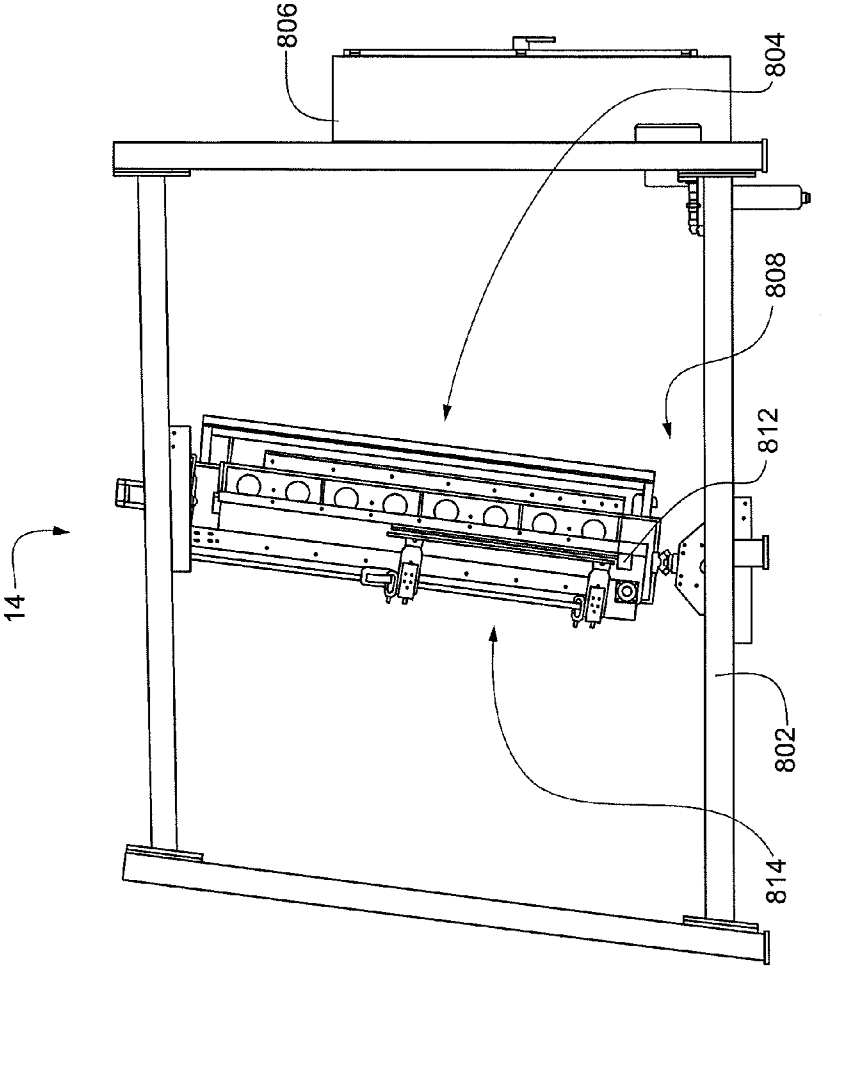
FIG. 14A is a side view of the apparatus of FIG. 8 at a particular operational stage.
Figure 15B:
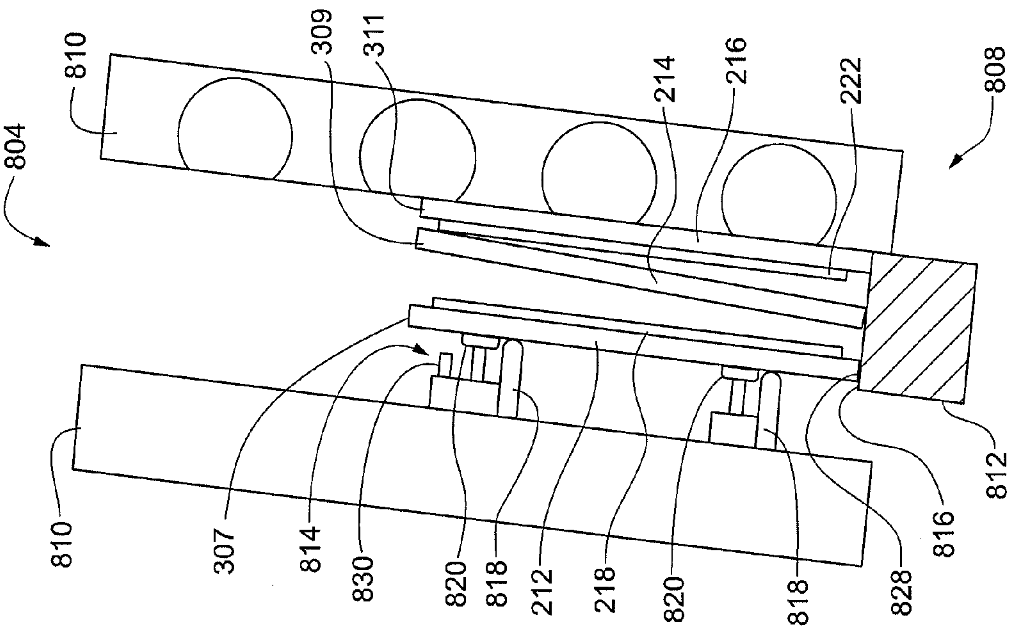
FIG. 15B is a schematic view of a portion of FIG. 15A.
Figure 15A:
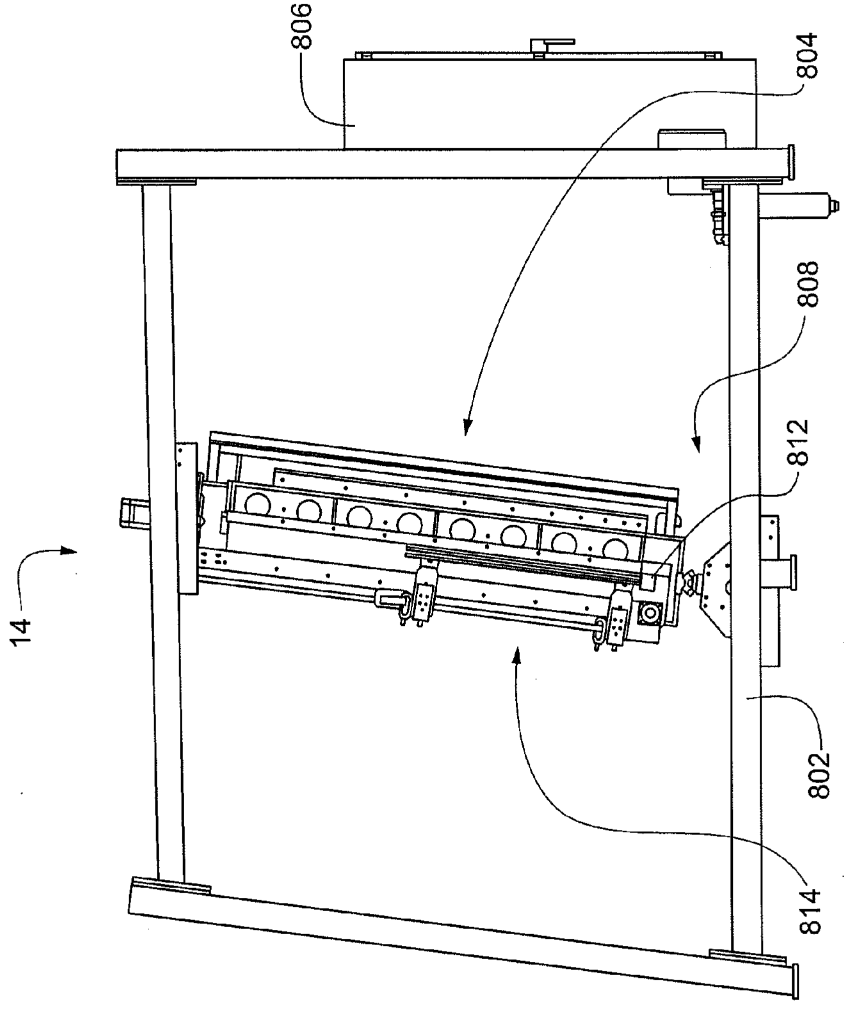
FIG. 15A is a side view of the apparatus of FIG. 8 at a particular operational stage.
Figure 16B:
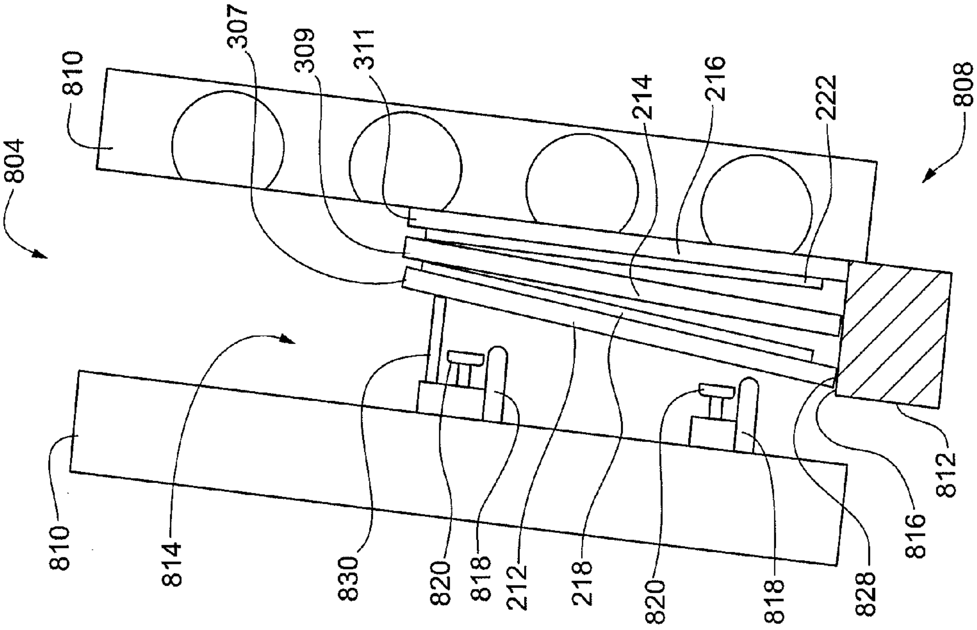
FIG. 16B is a schematic view of a portion of FIG. 16A.
Figure 16A:
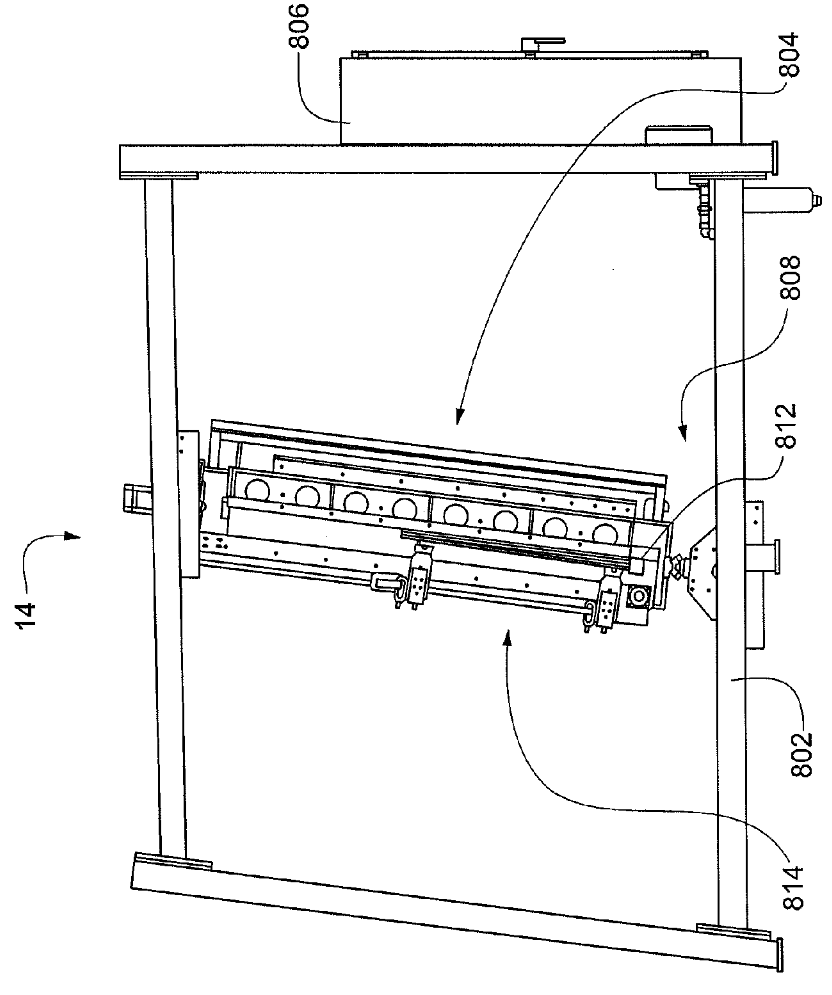
FIG. 16A is a side view of the apparatus of FIG. 8 at a particular operational stage.
Figure 17B:
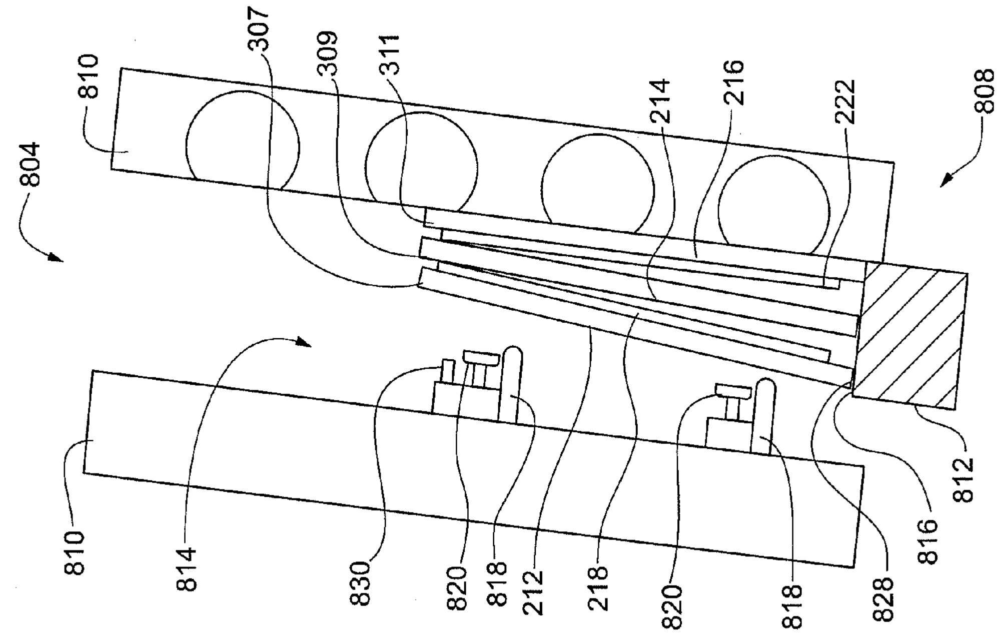
FIG. 17B is a schematic view of a portion of FIG. 17A.
Figure 17A:
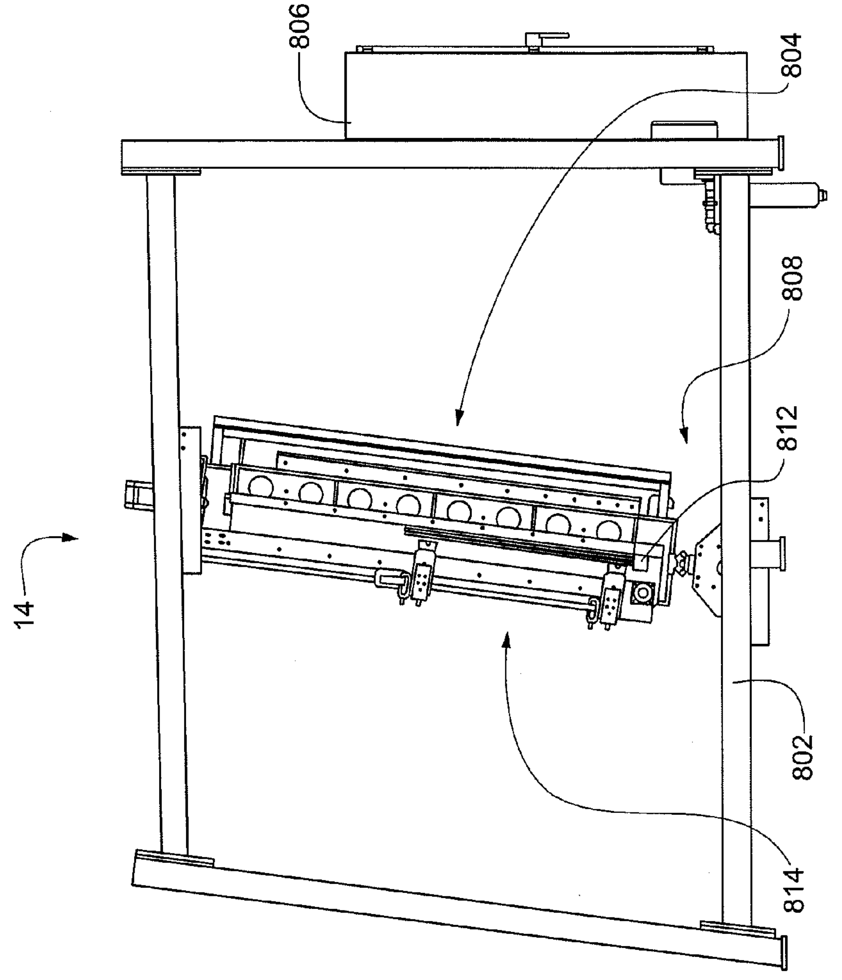
FIG. 17A is a side view of the apparatus of FIG. 8 at a particular operational stage.
Figure 18:
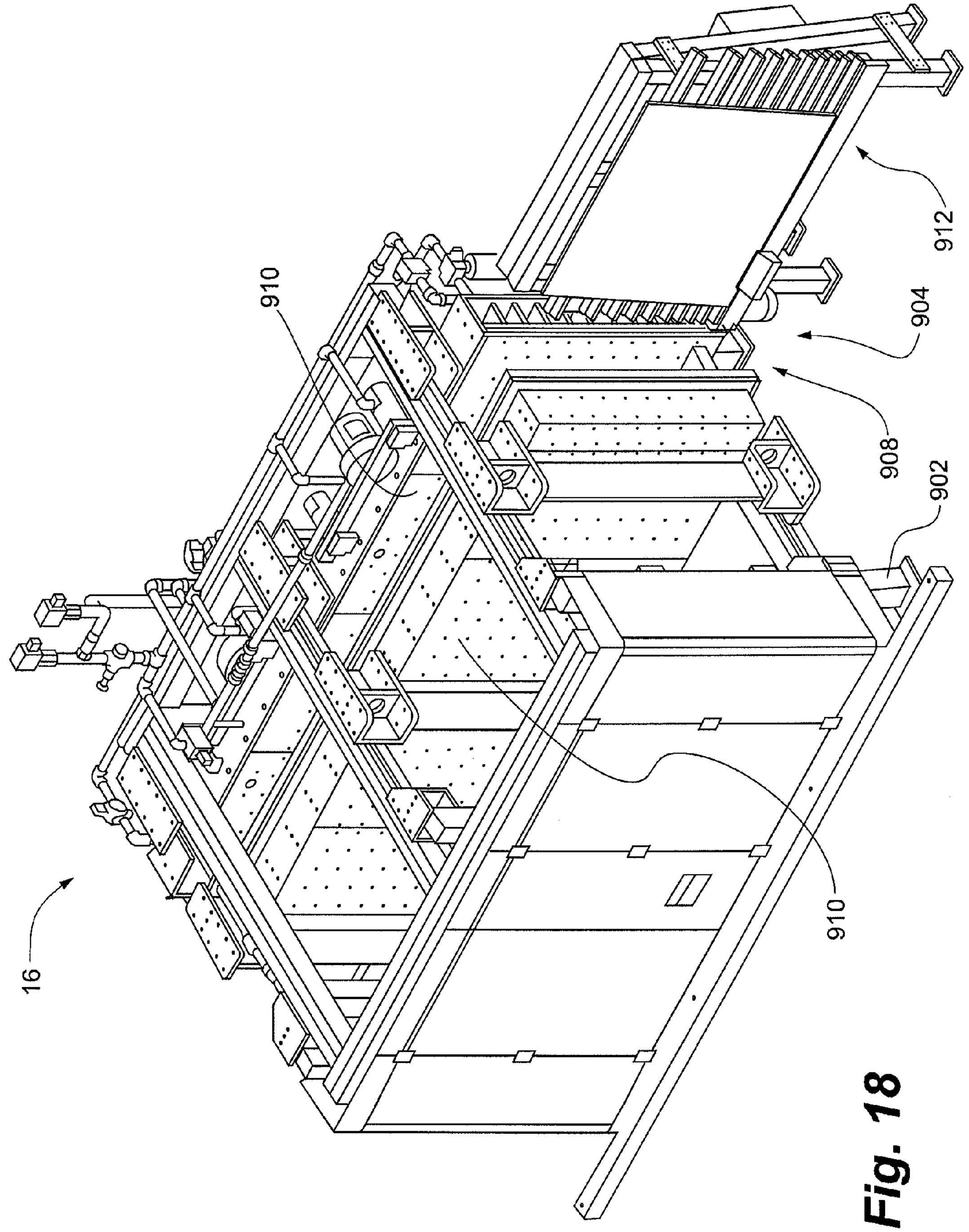
FIG. 18 is a perspective view of an illustrative apparatus for injecting gas into the spaces between the multiple glass panes and to seal such spaces, according to the present invention.
Figure 19B:
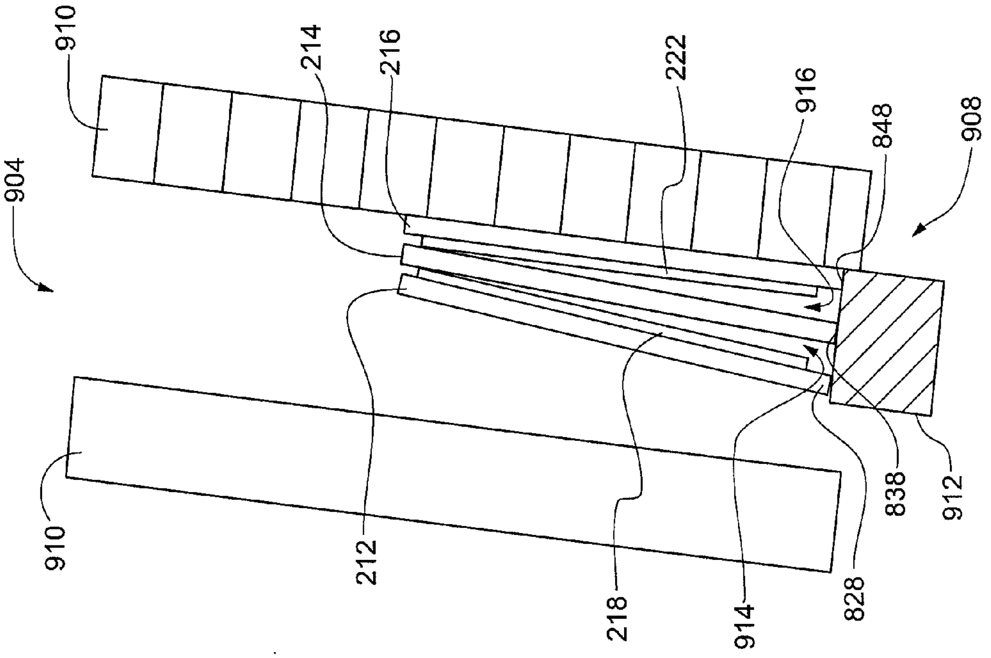
FIG. 19B is a schematic view of a portion of FIG. 19A.
Figure 19A:
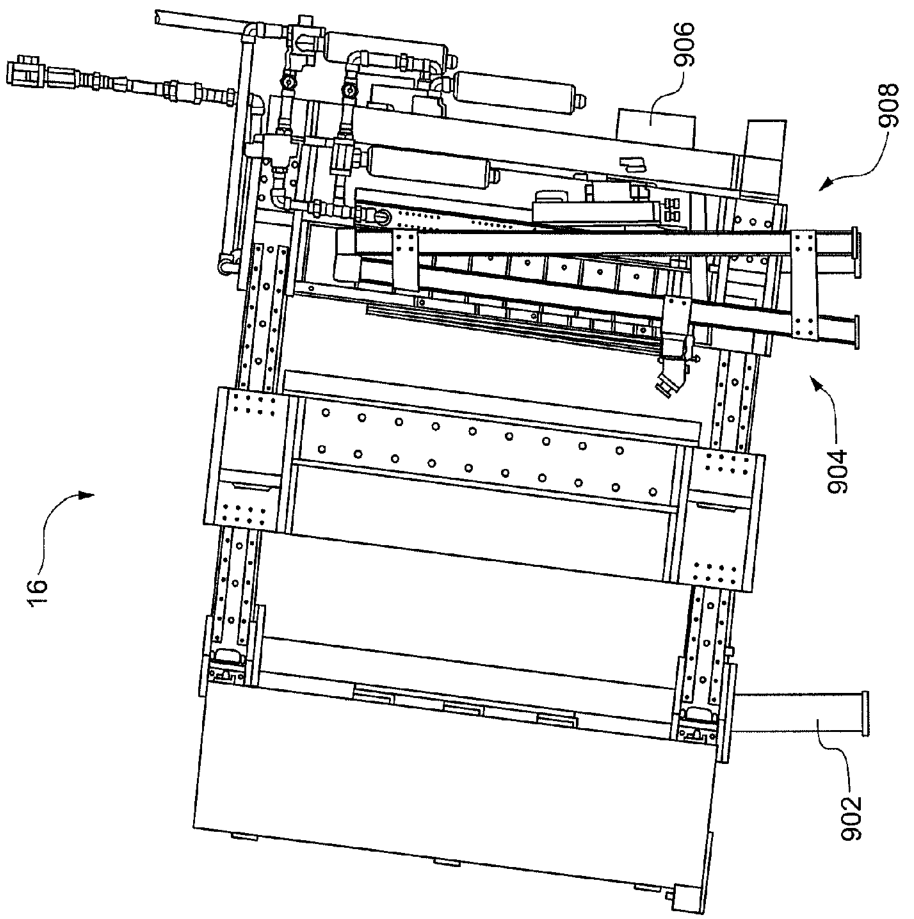
FIG. 19A is a side view of the apparatus of FIG. 18 at a particular operational stage.
Figure 20:
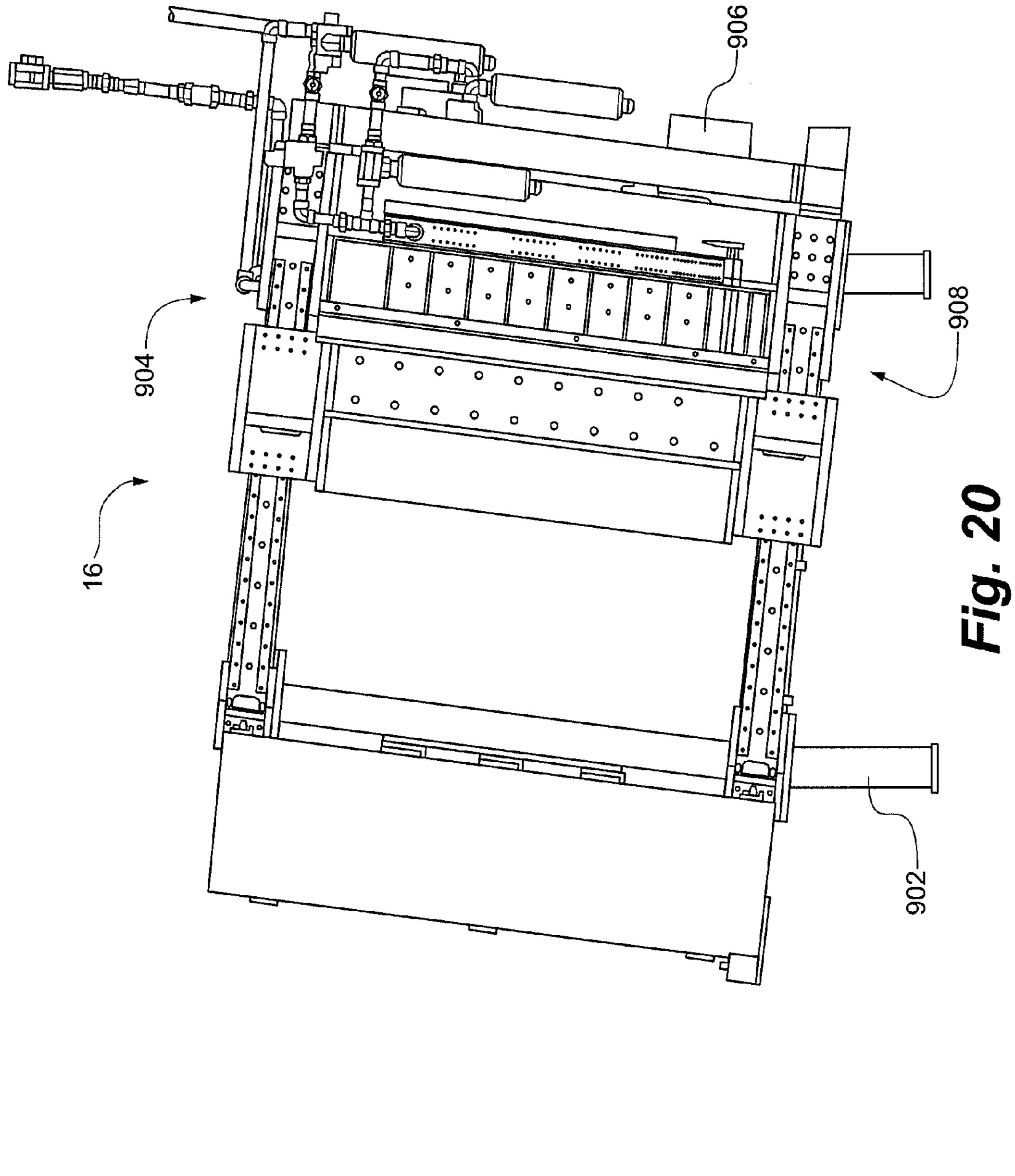
FIG. 20 is a side view of the apparatus of FIG. 18 at a particular operational stage.
Figure 21B:
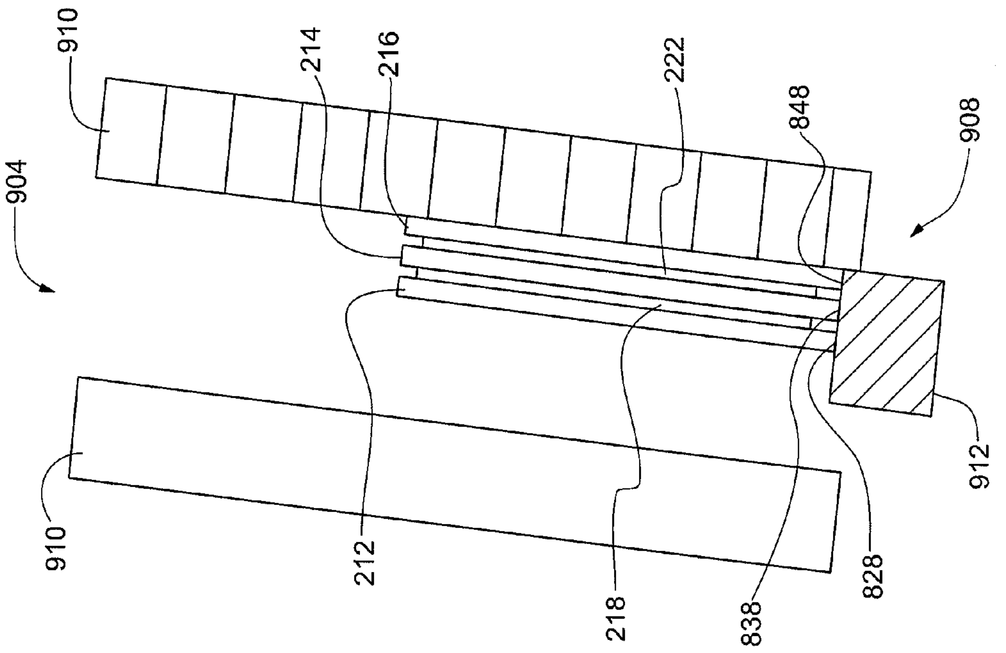
FIG. 21B is a schematic view of a portion of FIG. 21A.
Figure 21A:
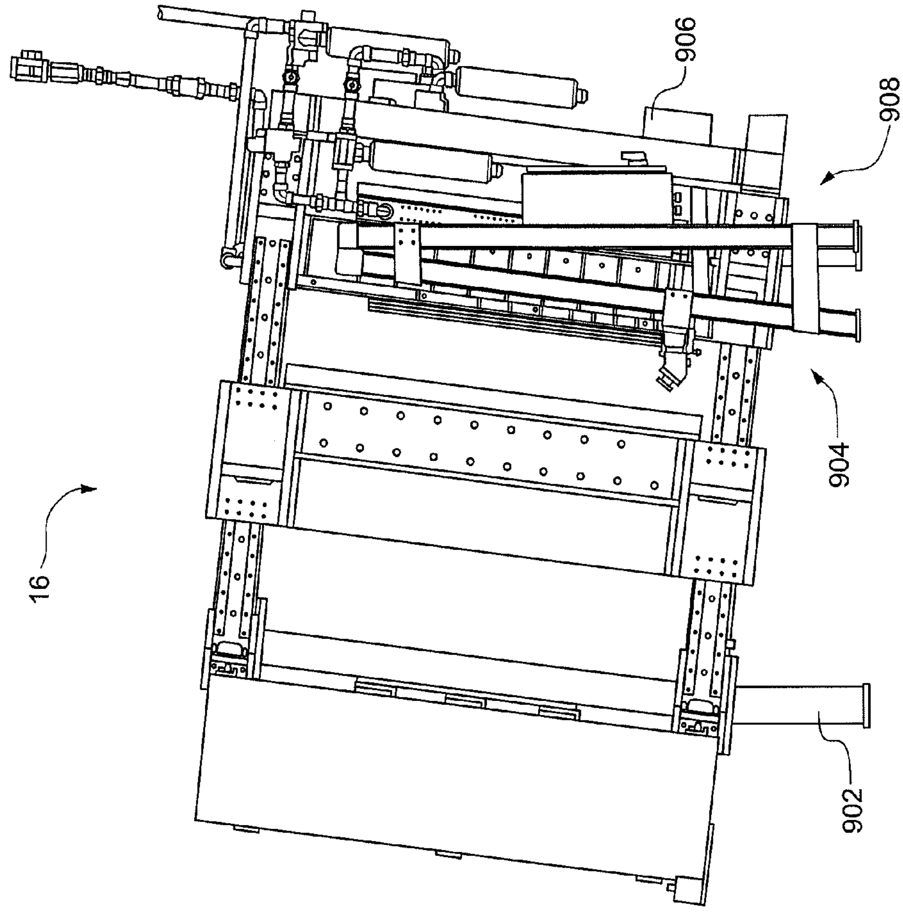
FIG. 21A is a side view of the apparatus of FIG. 18 at a particular operational stage.

With both the second and third glass panes 214, 216 being between the side panels 310 of the first apparatus 12, the first apparatus can assemble them such that they face one another and the second glass pane 214 contacts spacer 222 along at least one edge 309. The actuating mechanism 306 of the first apparatus 12 can be adapted to cause the first apparatus's securing mechanism 314 to press one edge 309 of the second glass pane 214 together with one edge 311 of the third glass pane 216 such that spacer 222 contacts the second glass pane 214. FIGS. 7A-7B show edge 309 of the second glass pane 214 pressed together with edge 311 of the third glass pane 216 such that the spacer 222 contacts the second glass pane 214. Edge 309 of the second glass pane 214 is near edge 311 of the third glass pane 216, with spacer 222 being positioned between the edges 309, 311. The two glass panes 214, 216 can form a "teepee" configuration.

The actuating mechanism 306 can be adapted to cause the first apparatus's conveying mechanism 312 to convey the second and third glass panes 214, 216 through the first apparatus 12. Referring again to FIG. 1, the first apparatus 12 is positioned proximate to the second apparatus 14. The second and third glass panes 214, 216, in the teepee configuration, can be conveyed from the first apparatus 12 to the second apparatus 14, where additional operations can be performed on the second and third glass panes 214, 216.

The second apparatus 14 can receive a first glass pane, re-orient the first glass pane, receive a two-pane teepee, and add the re-oriented first glass pane to the two-pane teepee to create a three-pane teepee. FIGS. 8-17B illustrate aspects of the second apparatus 14 of FIG. 1 in various stages of an illustrative operation. Like the first apparatus, the second apparatus 14 can include various structural features. The second apparatus can have a base 802, a glass pane handling mechanism 804, and an actuating mechanism 806. The second apparatus's glass pane handling mechanism 804 can include a support structure 808, two opposed side panels 810, a conveying mechanism 812, and a securing mechanism 814. These features can have many similar characteristics as their counterparts in the first apparatus 12. The glass pane handling mechanism's two opposed side panels 810 can be coupled to or integral with the support structure 808. The glass pane handling mechanism's conveying mechanism 812 and securing mechanism 814 can be coupled to the support structure 808. The conveying mechanism 812 can be adapted to convey glass panes into and out of a position between the opposed side panels 810. The securing mechanism 814 can be adapted to releasably secure glass panes conveyed into the position between the opposed side panels 810. As is discussed in grater detail below, the glass pane handling mechanism's support structure 808 can be rotatably coupled to the base 802.

The second apparatus's actuating mechanism 806 can control the operation of the second apparatus 14. The second apparatus's actuating mechanism 806 can be in electronic communication with the glass pane handling mechanism 804. The actuating mechanism 806 can be adapted to cause the second apparatus's conveying mechanism 812 to convey the first glass pane 212 into the position between the second apparatus's opposed side panels 810. In some embodiments, the conveying mechanism 812 can include a conveyor belt, rollers, a carriage, a chain, a float plate, or any suitable mechanism to permit conveyance of the glass panes without damaging them.

In many embodiments, the second apparatus's conveying mechanism 812 includes a conveyor belt 816 that is oriented generally perpendicularly to the opposed side panels 810, along with a plurality of idler rollers 818 that are coupled to each of the opposed side panels 810. In some embodiments, the major surface 221 of the first glass pane 212 that is opposite spacer 218 can be adapted to contact at least some of the plurality of idler rollers 818 when the first glass pane 212 is being conveyed into the position between the second apparatus's opposed side panels 810. In some embodiments, the second apparatus's conveying mechanism 812 can include a glass pane positioning sensor, which can be adapted to sense when glass panes are in the position between the second apparatus's opposed side panels 810 and to provide related information to the second apparatus's actuating mechanism 806. The actuating mechanism 806 can be adapted to cause the conveying mechanism 812 to stop conveying the first glass pane.

The actuating mechanism 806 can be adapted to cause the second apparatus's securing mechanism 814 to secure the first glass pane 212 on a major surface 221 of the first glass pane 212 that is opposite spacer 218. In embodiments in which the conveying mechanism 812 includes a conveyor belt 816, the second apparatus's securing mechanism 814 can secure the first glass pane 212 by lifting the first glass pane 212 off of the conveyor belt 816. With the first glass pane 212 secured, the conveying mechanism can be free to convey one or more glass panes in multiple directions without moving the first glass pane 212. In some embodiments, the securing mechanism 814 can include vacuum cups, mechanical clamps, or other suitable equipment for securing the glass panes.

In some embodiments, the second apparatus's securing mechanism 814 can include a plurality of vacuum cups 820 adapted to secure glass panes when signaled by the second apparatus's actuating mechanism 806. In some embodiments, the plurality of vacuum cups 820 can include first and second horizontal rows 822, 824 of vacuum cups 820. In some embodiments, the first and second horizontal rows 822, 824 can be controlled independently of one another. In some embodiments, the first horizontal row 822 of vacuum cups 820 can be vertically adjustable to accommodate different sizes of glass panes. In some embodiments, the second apparatus's securing mechanism 814 can include a rod 826 that is fixedly coupled to the second row 824 of horizontal vacuum cups 820 and releasably coupled to the first row 822 of horizontal vacuum cups 820. In such embodiments, the rod 826 can be adapted to be released from the first row 824 of horizontal vacuum cups 820 while the first row 822 of horizontal vacuum cups 820 is being vertically adjusted and also to be coupled to the first row 822 of horizontal vacuum cups 820 while the first row 822 of horizontal vacuum cups 820 is not being vertically adjusted. In some embodiments, the plurality of vacuum cups 820 can include an array of vacuum cups, with different vacuum cups being activated for differently shaped glass panes.

The actuating mechanism 806 can be adapted to cause the second apparatus's glass pane handling mechanism 804 to rotate 180° relative to the second apparatus's base 802. In many embodiments, the second apparatus's support structure 808 is rotatable about a vertical axis relative to the base 802. The first glass pane 212 can be held in fixed relationship relative to the glass pane handling mechanism 804 while rotating in space such that its major surfaces are facing opposite directions than before rotation. The glass pane handling mechanism 804 can be configured to align with equipment for performing previous and subsequent processes, both before and after rotation.

The actuating mechanism 806 can be adapted to cause the second apparatus's conveying mechanism 812 to convey the second and third glass panes 214, 216 into the position between the second apparatus's opposed side panels 810. In many embodiments, conveying the second and third glass panes 214, 216 involves running the conveying mechanism in the opposite direction from how it was run to convey the first glass pane 212 into position, due to the opposite orientation of the glass pane handling mechanism 804. A spacer 222 can be coupled to one major surface 224 of the third glass pane 216. One edge 309 of the second glass pane 214 can be pressed together with one edge 311 of the third glass pane 216 such that spacer 222 contacts the second glass pane 214. The second and third glass panes 214, 216 can form a two-pane teepee coming (directly or indirectly) from the first apparatus 12.

With the second and third glass panes 214, 216 in the proper position, the second apparatus 14 can add the first glass pane to form a three-pane teepee. The second apparatus's actuating mechanism 806 can be adapted to cause the securing mechanism 814 to press one edge 307 of the first glass pane 212 together with the one edge 309 of the second glass pane 214 and the one edge 311 of the third glass pane 216 such that spacer 218 contacts the second glass pane 214. In embodiments in which the conveying mechanism 812 includes a conveyor belt 816, the one edge 307 of the first glass pane 212, the one edge 309 of the second glass pane 214, and the one edge 311 of the third glass pane 216 can be opposite the conveyor belt 816. In some such embodiments, the securing mechanism 814 can press one edge 307 of the first glass pane 212 together with the one edge 309 of the second glass pane 214 and the one edge 311 of the third glass pane 216 and release the first glass pane 212 by bringing a lower edge 828 of the first glass pane 212 into contact with the conveyor belt 816 and activating one or more pins 830 to press the respective edges 307, 309 of the glass panes 212, 214 together. The second apparatus's actuating mechanism 806 can be adapted to cause the securing mechanism 814 to release the first glass pane 212.

As noted, the three-pane teepee can be provided to subsequent equipment for further processing. The second apparatus's actuating mechanism 806 can be adapted to cause the conveying mechanism 812 to convey the first, second, and third glass panes 212, 214, 216 out of the position between the opposed side panels 810 through the second apparatus 14.

As often as possible, the first and second apparatuses 12, 14 are operating at the same time. During a first cycle period, the first glass pane is conveyed into the first apparatus 12. During a second cycle period, the first glass pane is conveyed into the second apparatus 14 and flipped, the second glass pane is conveyed into the first apparatus 12 and secured, and the third glass pane is conveyed into the first apparatus 12 to form a two-pane teepee with the second glass pane. During a third cycle period, the two-pane teepee is conveyed into the second apparatus to form a three-pane teepee with the first glass pane, and another first glass pane is conveyed into the first apparatus 12. This pattern of cycles can continue until a desired amount of three-pane teepees (and ultimately triple-pane IG units) are formed. In this way, system efficiencies can be significantly enhanced.

Referring again to FIG. 1, the illustrative system 10 for the construction of triple-pane insulating glass units can include a third apparatus 16. As noted above, the third apparatus 16 can be configured to receive a three-pane teepee from the second apparatus 14, to inject gas into the two spaces between the three panes, and to press the three panes together such that the spacer-less pane contacts both spacers on all sides, thereby sealing the two spaces between the panes. FIGS. 18-21B illustrate aspects of the third apparatus 16 of FIG. 1 in various stages of an illustrative operation. Like the first and second apparatuses, the third apparatus 16 can include various structural features. The third apparatus 16 can include a base 902, a glass pane handling mechanism 904, and an actuating mechanism 906. These features can have many similar characteristics as their counterparts in the first and second apparatuses 12, 14. For example, the glass pane handling mechanism 904 can include a support structure 908, two opposed side panels 910, and a conveying mechanism 912. The glass pane handling mechanism's support structure 908 can be coupled to the base 902. The glass pane handling mechanism's two opposed side panels 910 can be coupled to or integral with the support structure 908. The glass pane handling mechanism's conveying mechanism 912 can be coupled to the support structure 908. The conveying mechanism 912 can be adapted to convey glass panes into and out of a position between the opposed side panels 910.

In use, the third apparatus's actuating mechanism 906 can control operation of the third apparatus 16. The third apparatus's actuating mechanism 906 can be in electronic communication with the glass pane handling mechanism 904. The actuating mechanism 906 can be adapted to cause the third apparatus's conveying mechanism 912 to convey the first, second, and third glass panes 212, 214, 216 into the position between the third apparatus's opposed side panels 910. With the glass panes 212, 214, 216 in position, the actuating mechanism 906 can be adapted to cause the third glass pane handling mechanism 904 to supply gas to spaces 914, 916 between the first and second glass panes 212, 214 and between the second and third glass panes 214, 216. As noted above, this gas can significantly improve performance of the finished unit.

In many systems, the third apparatus 16 can act as a bottleneck in the overall manufacturing process. Filling the spaces 914, 916 one at a time can add significant amounts of time to the construction process. Accordingly, it can be desirable to fill both spaces 914, 916 simultaneously. Doing so, however, can present challenges, as it can be difficult to supply a sufficient volume of gas to both between-pane spaces simultaneously. One way to meet this challenge is to supply the spaces 914, 916 from separate gas sources. A row of nozzles can be aligned with each space 914, 916, with each row being connected to its own gas source. When the gas sources are activated, a sufficient quantity of gas can be supplied to both spaces 914, 916.

Figure 22:
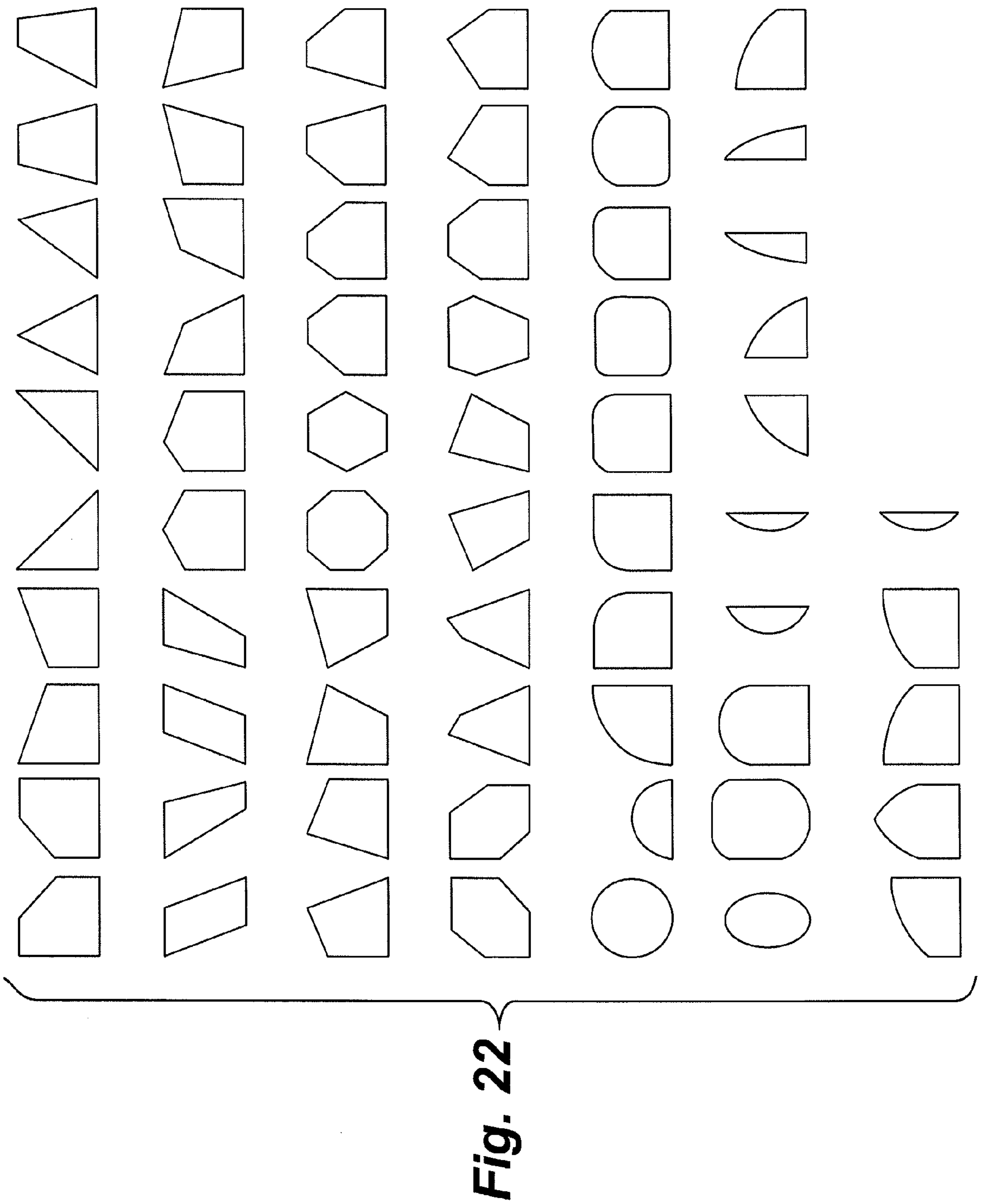
FIG. 22 is a non-exhaustive collection of illustrative IG unit shapes that can be accommodated by embodiments of the present invention.

The actuating mechanism 906 can be adapted to cause the third glass pane handling mechanism 904 to press remaining edges 828, 838, 848 of the first, second, and third glass panes 212, 214, 216 together such that both spacers 218, 222 contact the second glass pane 214. If the first, second, and third glass panes 212, 214, 216 are rectangular in shape, the third glass pane handling mechanism 904 can press the side edges and the bottom edge together. If the first, second, and third edges are shaped otherwise (such as the shapes shown in FIG. 22), the third glass pane handling mechanism 904 can press together whichever sides are not already pressed together. In many embodiments, the third apparatus's actuating mechanism 906 is further adapted to cause the third apparatus's conveying mechanism 912 to convey the first, second, and third glass panes 212, 214, 216 through the third apparatus 16. It should be noted that multiple teepees are often processed by the third apparatus 16 simultaneously. As noted above, the three-pane, gas-filled unit can be conveyed to subsequent equipment for further processing.

One or more methods of constructing triple-pane insulating glass units can be performed with some or all of the equipment discussed herein or with other suitable equipment. Some methods can include conveying a first glass pane into a position between two opposed side panels of an assembly apparatus. In some embodiments, a first-pane spacer can be coupled to one major surface of the first glass pane. Some methods can include securing the first glass pane on an opposite major surface of the first glass pane with the assembly apparatus. Some methods can include rotating at least part of the assembly apparatus 180°, thereby causing the first glass pane to rotate 180°. Some methods can include conveying second and third glass panes into the position between the two opposed side panels of the assembly apparatus. In some embodiments, a third-pane spacer can be coupled to one major surface of the third glass pane. In some such embodiments, one edge of the second glass pane can be pressed together with one edge of the third glass pane such that the third-pane spacer contacts the second glass pane. Some methods can include pressing one edge of the first glass pane together with the one edge of the second glass pane and the one edge of the third glass pane such that the first-pane spacer contacts the second glass pane. Some methods can include releasing the first glass pane. Some methods can include conveying the first, second, and third glass panes out of the position between the opposed side panels of the assembly apparatus.

Some methods involve a gas-supplying apparatus, such as those discussed elsewhere herein. Some methods can include conveying the first, second, and third glass panes into a position between two opposed side panels of a gas-supplying apparatus. Some methods can include supplying gas with the gas-supplying apparatus to space between the first and second glass panes and between the second and third glass panes. Some methods can include pressing remaining edges of the first, second, and third glass panes together such that both the first-pane and third-pane spacers contact the second glass pane. Some methods can include conveying the first, second, and third glass panes out of the position between the opposed side panels of the gas-supplying apparatus.

Some methods involve a conveyor belt and a plurality of idler rollers, such as those discussed elsewhere herein. Conveying glass panes into the position between the two opposed side panels of the assembly apparatus can include conveying the glass panes via (i) a conveyor belt oriented generally perpendicularly to the opposed side panels and (ii) a plurality of idler rollers coupled to each of the opposed side panels. Conveying glass panes into the position between the two opposed side panels of the assembly apparatus can include contacting the major surface of the first glass pane that is opposite the first-pane spacer with at least some of the plurality of idler rollers. Pressing the one edge of the first glass pane together with the one edge of the second glass pane and the one edge of the third glass pane can include bringing an edge of the first glass pane into contact with the conveyor belt and activating one or more pins to press the respective edges of the glass panes together. In some embodiments, securing the first glass pane can include lifting the first glass pane off of the conveyor belt.

Some methods according to the present invention include one or more of the following features. Rotating at least part of the assembly apparatus 180° can include rotating at least part of the assembly apparatus 180° about a vertical axis, thereby causing the first glass pane to rotate 180°. In some embodiments, the first, second, and third glass panes are rectangular. In some embodiments, the major surface of the first glass pane to which the first-pane spacer is coupled is coated with one or more glass coatings (such as those discussed elsewhere herein). In some embodiments, the major surface of the third glass pane to which the third-pane spacer is coupled is coated with one or more glass coatings (such as those discussed elsewhere herein). Conveying the first glass pane into a position between two opposed side panels of the assembly apparatus can include sensing when the first glass pane is in the position between the opposed side panels of the assembly apparatus with a glass pane positioning sensor and providing related information to an actuating mechanism of the assembly apparatus. Securing the first glass pane on the opposite major surface of the first glass pane can include securing the first glass pane on the opposite major surface of the first glass pane with a plurality of vacuum cups. In some such embodiments, the plurality of vacuum cups can include first and second horizontal rows of vacuum cups.

In the foregoing detailed description, the invention has been described with reference to specific embodiments. However, it may be appreciated that various modifications and changes can be made without departing from the scope of the invention as set forth in the appended claims. Thus, some of the features of preferred embodiments described herein are not necessarily included in preferred embodiments of the invention which are intended for alternative uses.

What is claimed is:

1. A method of constructing triple-pane insulating glass units, the method comprising:

(a) conveying a first glass pane into a position between two opposed side panels of an assembly apparatus, a first-pane spacer being coupled to one major surface of the first glass pane;

(b) securing the first glass pane on an opposite major surface of the first glass pane with the assembly apparatus;

(c) rotating at least part of the assembly apparatus 180°, thereby causing the first glass pane to rotate 180°, (d) conveying second and third glass panes into the position between the two opposed side panels of the assembly apparatus, a third-pane spacer being coupled to one major surface of the third glass pane, one edge of the second glass pane being pressed together with one edge of the third glass pane such that the third-pane spacer contacts the second glass pane;

(e) pressing one edge of the first glass pane together with the one edge of the second glass pane and the one edge of the third glass pane such that the first-pane spacer contacts the second glass pane;

(f) releasing the first glass pane; and (g) conveying the first, second, and third glass panes out of the position between the opposed side panels of the assembly apparatus.

2. The method of claim 1, further comprising:

(h) conveying the first, second, and third glass panes into a position between two opposed side panels of a gas-supplying apparatus;

(i) supplying gas with the gas-supplying apparatus to space between the first and second glass panes and between the second and third glass panes;

(j) pressing remaining edges of the first, second, and third glass panes together such that both the first-pane and third-pane spacers contact the second glass pane.

3. The method of claim 2, further comprising:

(k) conveying the first, second, and third glass panes out of the position between the opposed side panels of the gas-supplying apparatus.

4. The method of claim 1, wherein rotating at least part of the assembly apparatus 180° comprises rotating at least part of the assembly apparatus 180° about a vertical axis, thereby causing the first glass pane to rotate 180°.

5. The method of claim 1, wherein the first, second, and third glass panes are rectangular.

6. The method of claim 1, wherein conveying glass panes into the position between the two opposed side panels of the assembly apparatus includes conveying the glass panes via a conveyor belt oriented generally perpendicularly to the opposed side panels and a plurality of idler rollers coupled to each of the opposed side panels.

7. The method of claim 6, wherein pressing the one edge of the first glass pane together with the one edge of the second glass pane and the one edge of the third glass pane comprises bringing an edge of the first glass pane into contact with the conveyor belt and activating one or more pins to press the respective edges of the glass panes together.

8. The method of claim 7, wherein securing the first glass pane includes lifting the first glass pane off of the conveyor belt.

9. The method of claim 6, wherein conveying glass panes into the position between the two opposed side panels of the assembly apparatus includes contacting the major surface of the first glass pane that is opposite the first-pane spacer with at least some of the plurality of idler rollers.

10. The method of claim 1, wherein the major surface of the first glass pane to which the first-pane spacer is coupled is coated with one or more glass coatings.

11. The method of claim 10, wherein the major surface of the third glass pane to which the third-pane spacer is coupled is coated with one or more glass coatings.

12. The method of claim 1, wherein conveying the first glass pane into a position between two opposed side panels of the assembly apparatus includes sensing when the first glass pane is in the position between the opposed side panels of the assembly apparatus with a glass pane positioning sensor and providing related information to an actuating mechanism of the assembly apparatus.

13. The method of claim 1, wherein securing the first glass pane on the opposite major surface of the first glass pane includes securing the first glass pane on the opposite major surface of the first glass pane with a plurality of vacuum cups.

14. The method of claim 13, wherein the plurality of vacuum cups comprises first and second horizontal rows of vacuum cups.

* * * * *